United States Patent
Shoji et al.

(10) Patent No.: US 10,294,058 B2
(45) Date of Patent: May 21, 2019

(54) ROLLER COVERED WITH COVERING COMPRISING WOVEN FABRIC, AND APPARATUS EMPLOYING SAME

(71) Applicants: SANWA TECHNO CO., LTD., Kobe-shi, Hyogo (JP); Susumu Shoji, Kobe-Shi, Hyogo (JP)

(72) Inventors: Susumu Shoji, Kobe (JP); Kazuro Fukui, Kobe (JP)

(73) Assignees: SANWA TECHNO CO., LTD., Kobe-shi, Hyogo (JP); Susumu Shoji, Kobe-shi, Hyogo (JP)

(*) Notice: Subject to any disclaimer, the term of this patent is extended or adjusted under 35 U.S.C. 154(b) by 0 days.

(21) Appl. No.: 15/027,166

(22) PCT Filed: Oct. 4, 2013

(86) PCT No.: PCT/JP2013/077187
§ 371 (c)(1),
(2) Date: Apr. 4, 2016

(87) PCT Pub. No.: WO2015/049808
PCT Pub. Date: Apr. 9, 2015

(65) Prior Publication Data
US 2016/0229653 A1 Aug. 11, 2016

(51) Int. Cl.
*B65H 27/00* (2006.01)
*B65H 5/22* (2006.01)
(Continued)

(52) U.S. Cl.
CPC .............. *B65H 27/00* (2013.01); *B08B 1/04* (2013.01); *B65H 5/226* (2013.01); *B65H 3/10* (2013.01);
(Continued)

(58) Field of Classification Search
CPC .......... B65H 27/00; B65H 5/226; B65H 3/10; B65H 2401/141; F16C 13/00
See application file for complete search history.

(56) References Cited

U.S. PATENT DOCUMENTS 3,308,522 A * 3/1967 Miller ................ B29D 99/0035
101/420
4,384,782 A * 5/1983 Acquaviva ......... G03B 27/6257
271/197
(Continued)

FOREIGN PATENT DOCUMENTS

JP 56-166592 U 6/1982
JP 62-100956 A 5/1987
(Continued)

OTHER PUBLICATIONS

International Search Report dated Nov. 5, 2013, issued in International Application No. PCT/JP2013/077187 (2 pages).

*Primary Examiner* — Howard J Sanders
(74) *Attorney, Agent, or Firm* — Westerman, Hattori, Daniels & Adrian, LLP

(57) ABSTRACT

A roller which has woven fabric at a surface thereof and which is employed in an apparatus permitting achievement of conservation of resources, conservation of energy. Roller 1 provided with covering 3 includes woven fabric at its surface is idler means or drive means for conveying, supply, of an object, means for air cooling or drying a moving object, rotating means making use of suction of an object, or is for cleaning a contact surface to which roller 1 is opposed, and has at the surface woven fabric 2 with variation or combination of weave pattern(s). The woven fabric 2 includes weaving in a linear pattern of bands or different patterns. It also has open holes including lattice-like gaps 8
(Continued)

or a rectangular pattern 6 for control of air permeability formed from weft yarn 25 and warp yarn 26.

16 Claims, 18 Drawing Sheets

(51) Int. Cl.
  *B08B 1/04* (2006.01)
  *F16C 13/00* (2006.01)
  *G03G 15/00* (2006.01)
  *G03G 15/20* (2006.01)
  *B65H 3/10* (2006.01)

(52) U.S. Cl.
  CPC .. *B65H 2401/115* (2013.01); *B65H 2401/141* (2013.01); *B65H 2404/117* (2013.01); *B65H 2404/1112* (2013.01); *B65H 2404/18* (2013.01); *B65H 2801/12* (2013.01); *F16C 13/00* (2013.01); *G03G 15/00* (2013.01); *G03G 15/206* (2013.01); *G03G 2215/00683* (2013.01)

(56) References Cited

U.S. PATENT DOCUMENTS

| | | | | |
|---|---|---|---|---|
| 9,617,077 | B2* | 4/2017 | Shoji | B65H 5/02 |
| 2014/0001014 | A1* | 1/2014 | Shoji | B65G 15/30 |
| | | | | 198/846 |
| 2016/0185549 | A1* | 6/2016 | Roska | B65H 27/00 |
| | | | | 226/1 |
| 2016/0289034 | A1* | 10/2016 | Shoji | B65H 5/226 |

FOREIGN PATENT DOCUMENTS

| | | |
|---|---|---|
| JP | 3-71848 A | 3/1991 |
| JP | 5-45034 A | 2/1993 |
| JP | 8-53251 A | 2/1996 |
| JP | 8-239146 A | 9/1996 |
| JP | 9-67053 A | 3/1997 |
| JP | 10-204779 A | 8/1998 |
| JP | 2007-254141 A | 10/2007 |
| WO | 2012/120606 A1 | 9/2012 |

* cited by examiner

[FIG. 1]
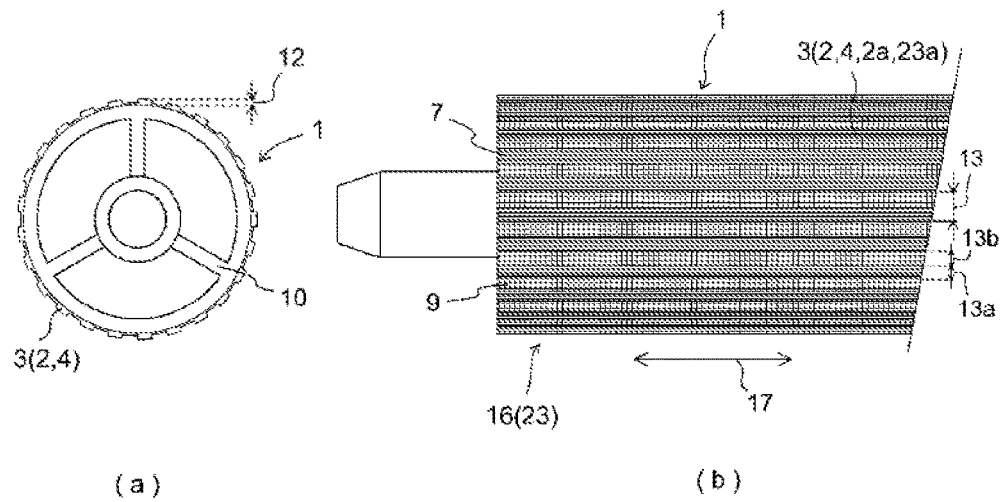
(a)  (b)
[FIG. 2]
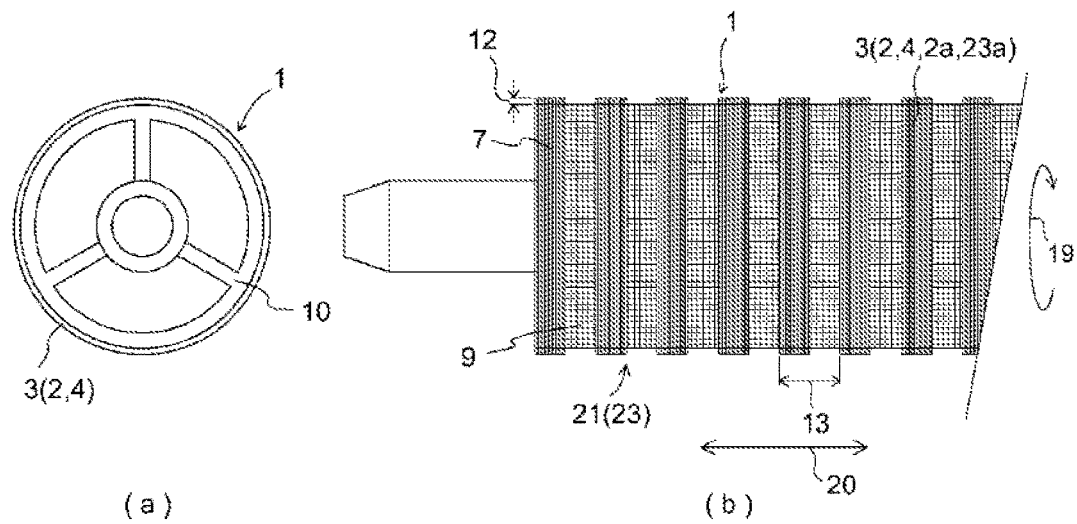
(a)  (b)

[FIG. 3]
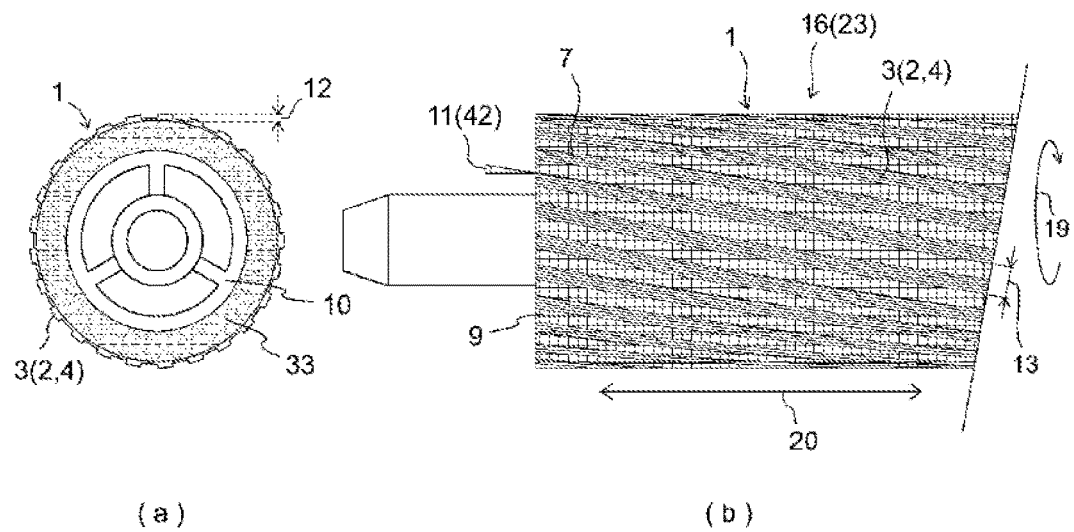
(a)　　　　　　　　　　　(b)
[FIG. 4]
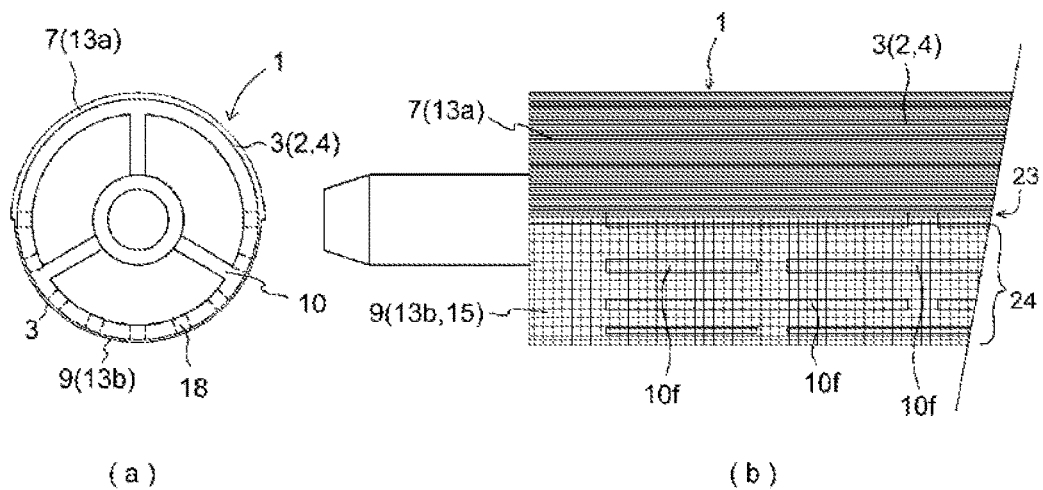
(a)　　　　　　　　　　　(b)

[FIG. 5]
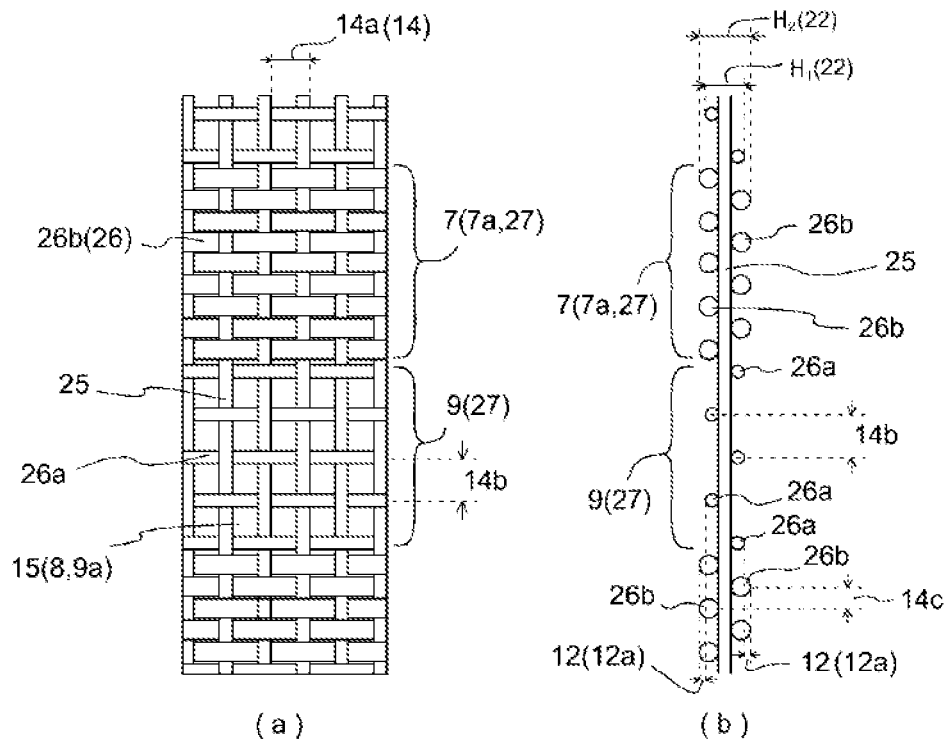
(a)    (b)
[FIG. 6]
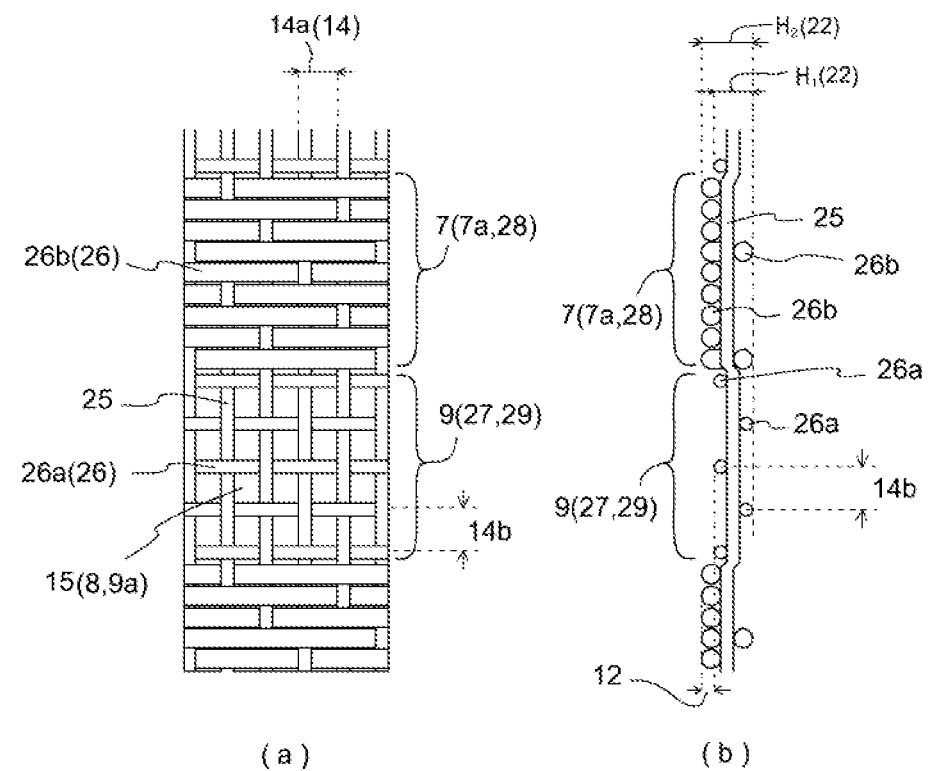
(a)    (b)

[FIG. 7]
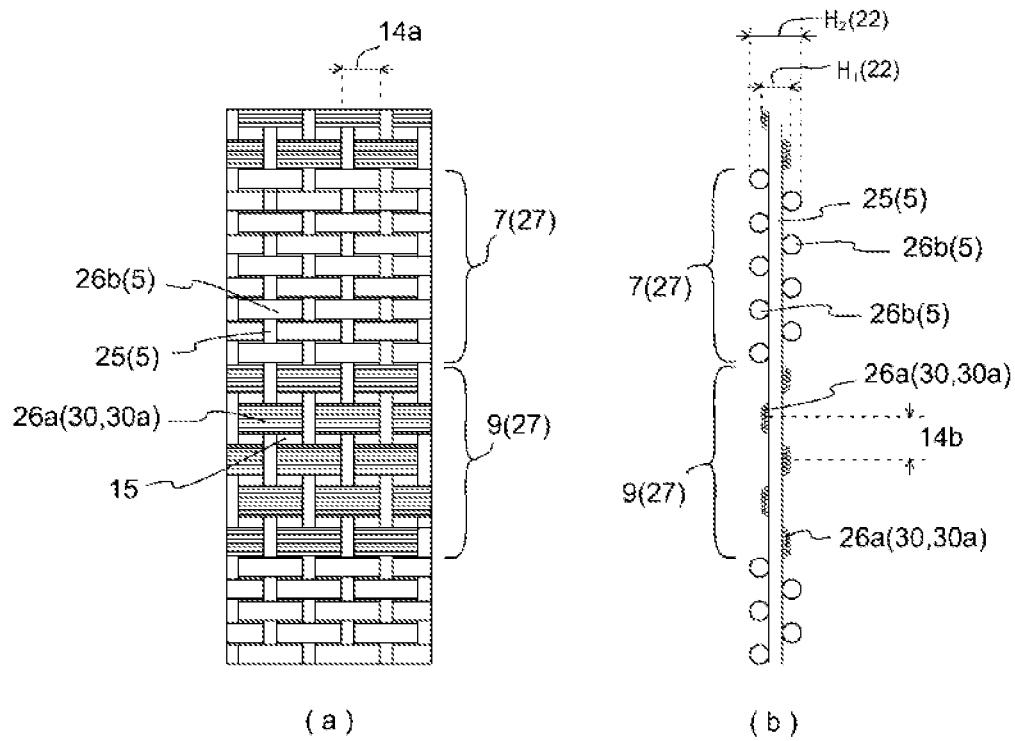
(a) (b)
[FIG. 8]
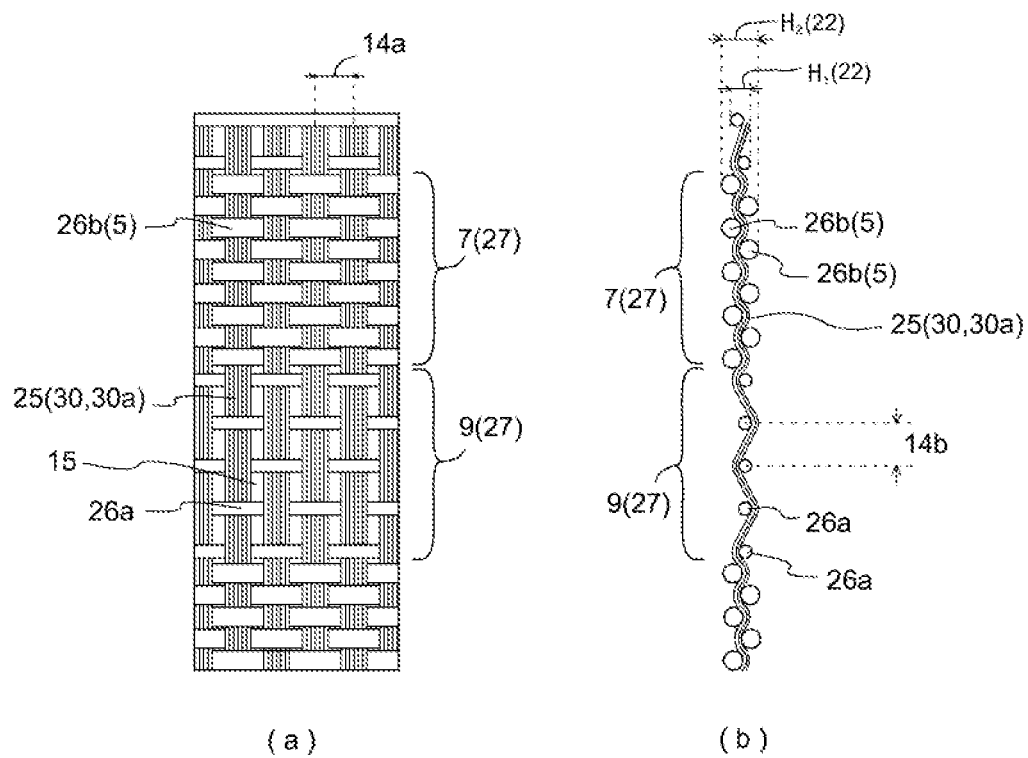
(a) (b)

[FIG. 9]
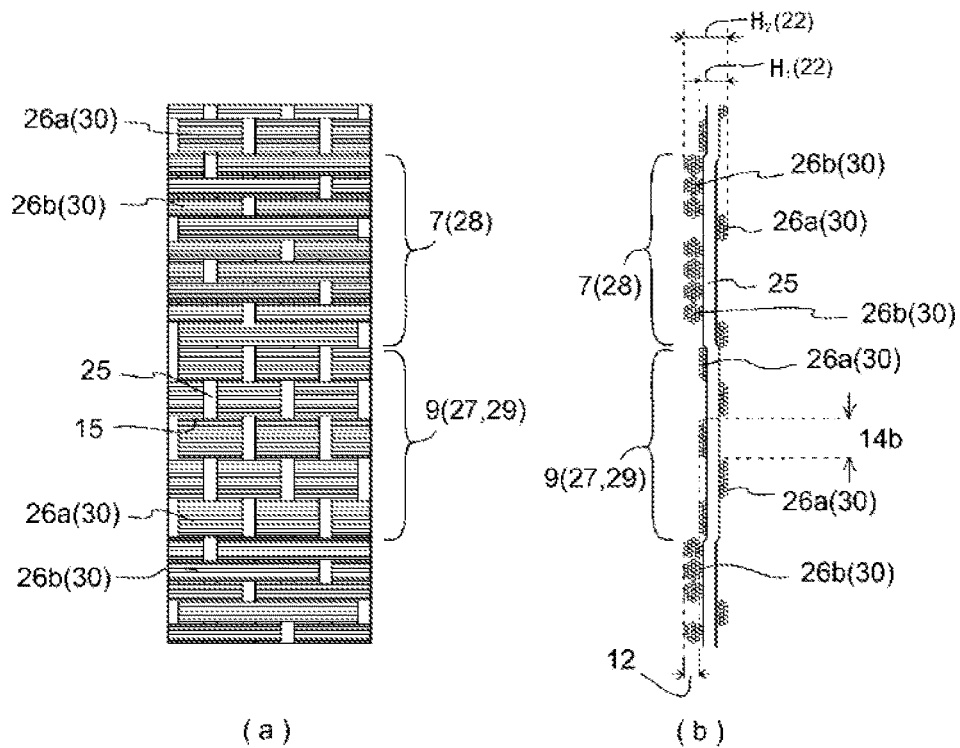
(a)   (b)
[FIG. 10]
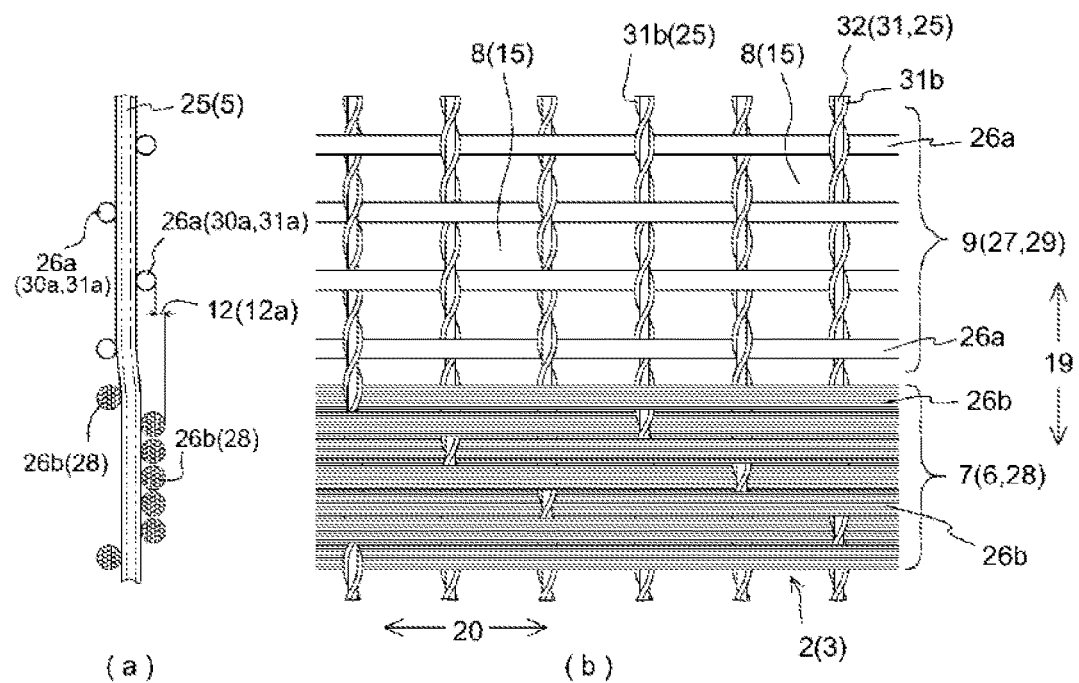
(a)   (b)

[FIG. 11]
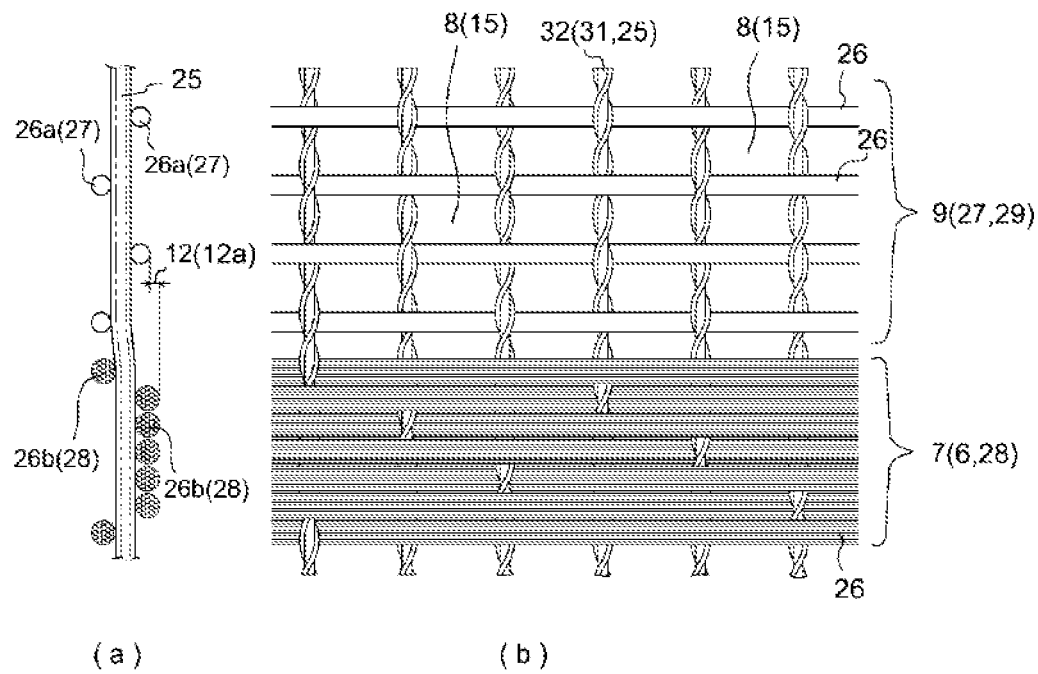
(a)　　　　　　　　(b)
[FIG. 12]
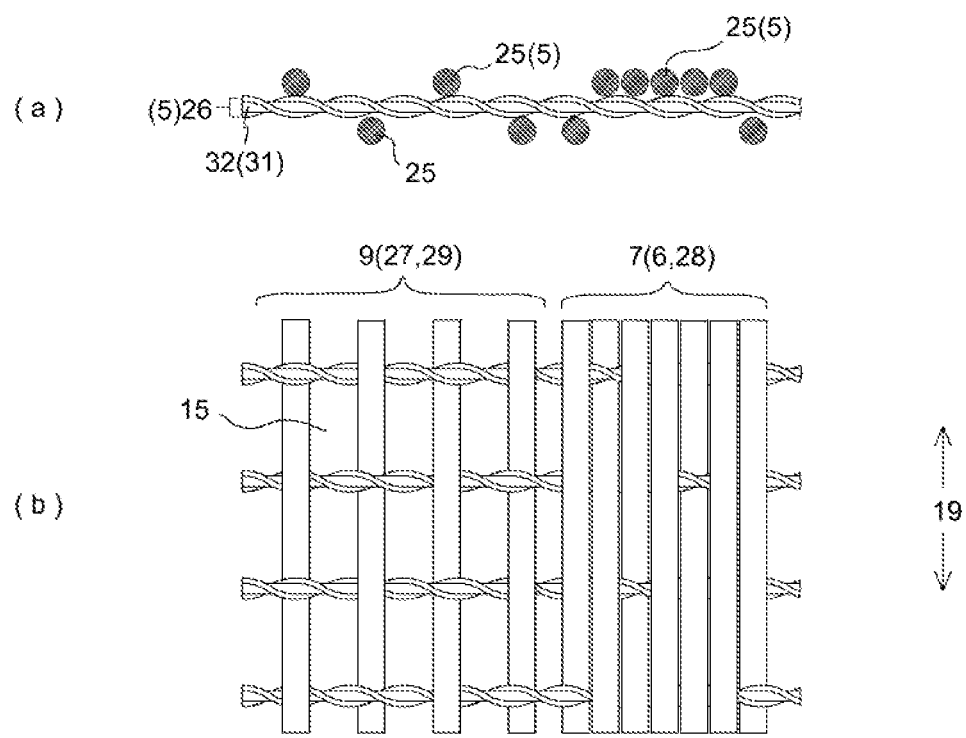

[FIG. 13]
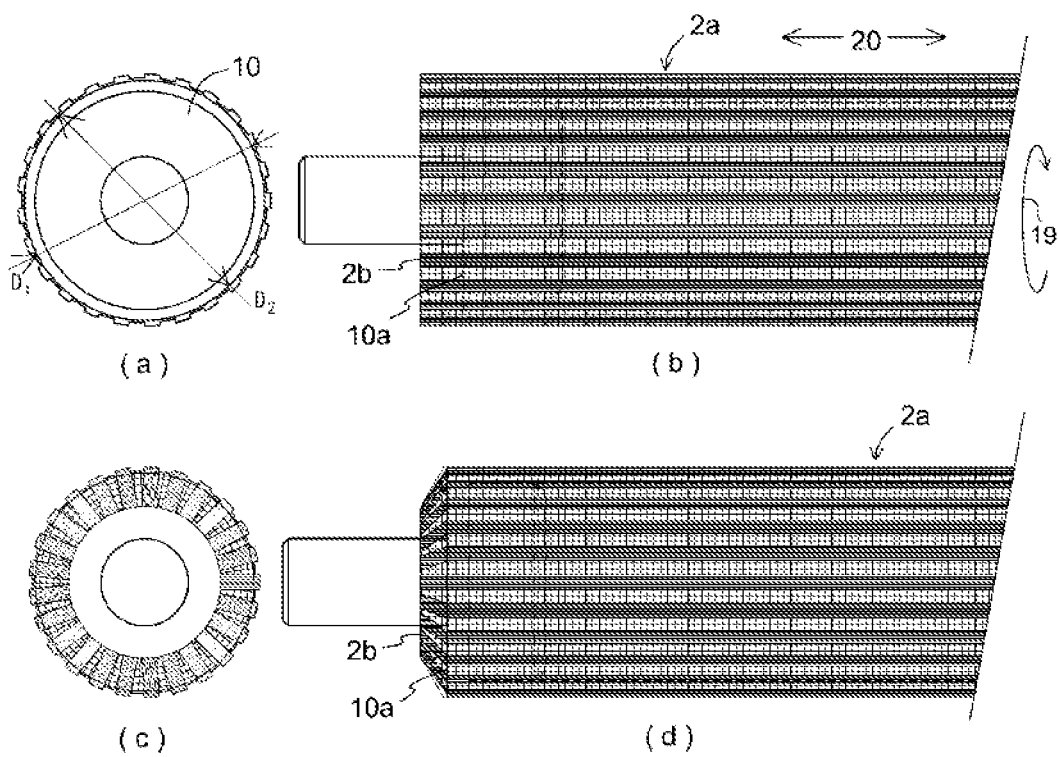

[FIG. 14]
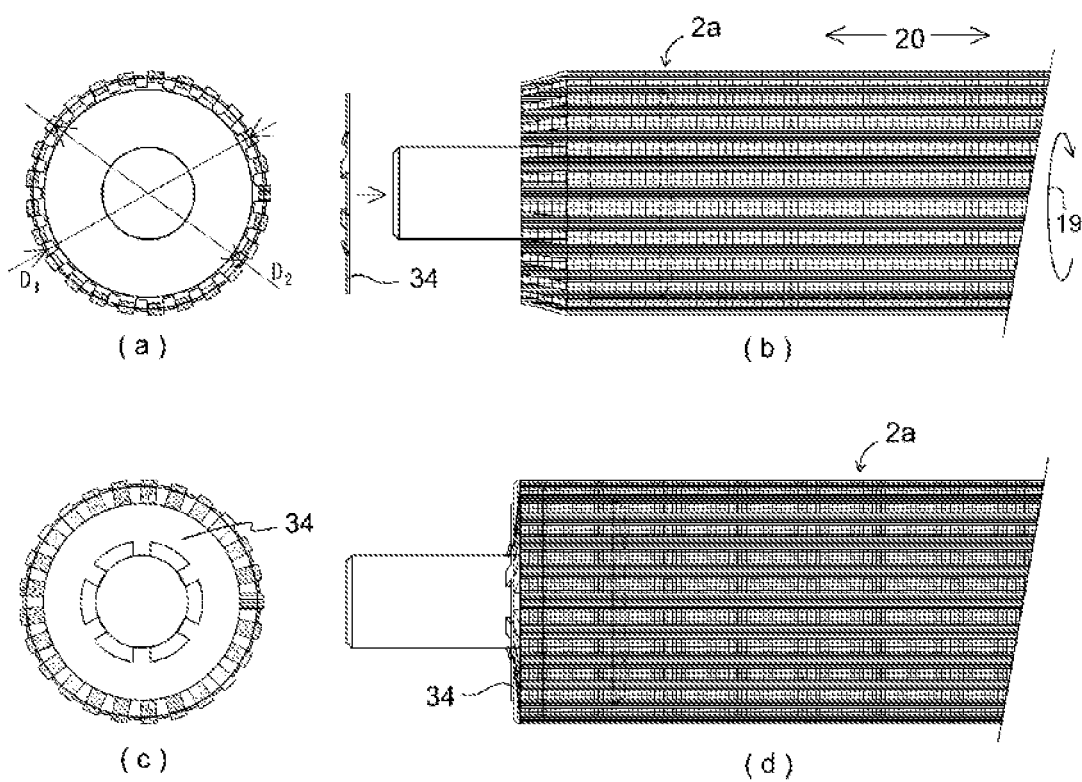

[FIG. 15]
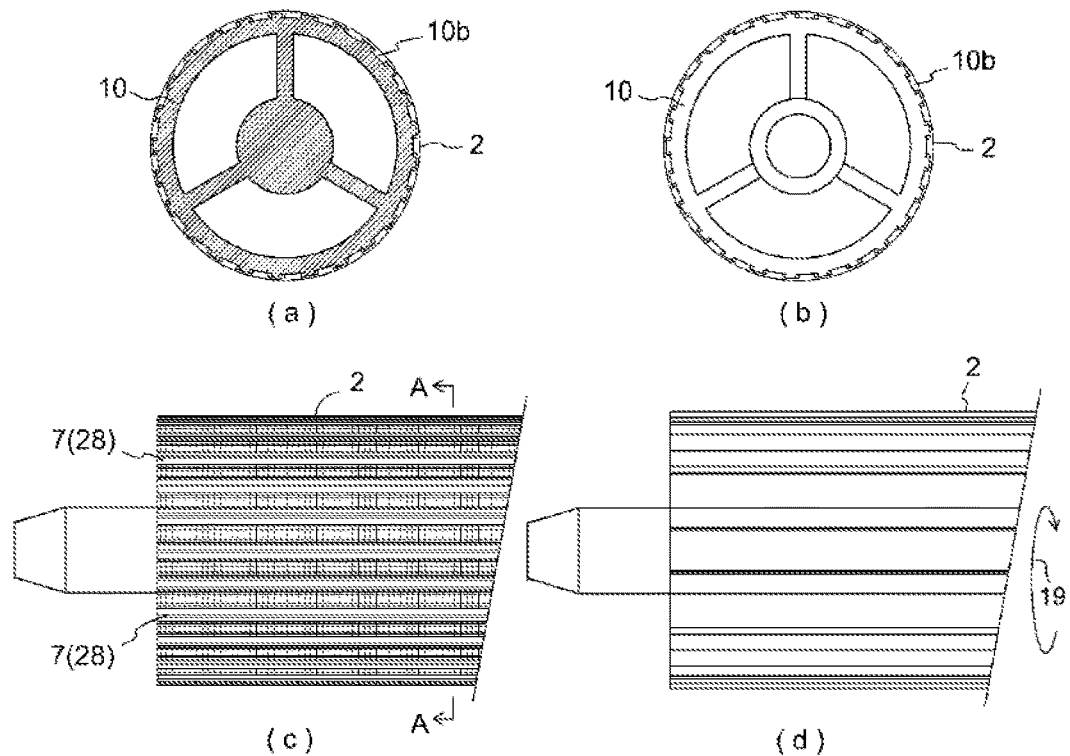
[FIG. 16]
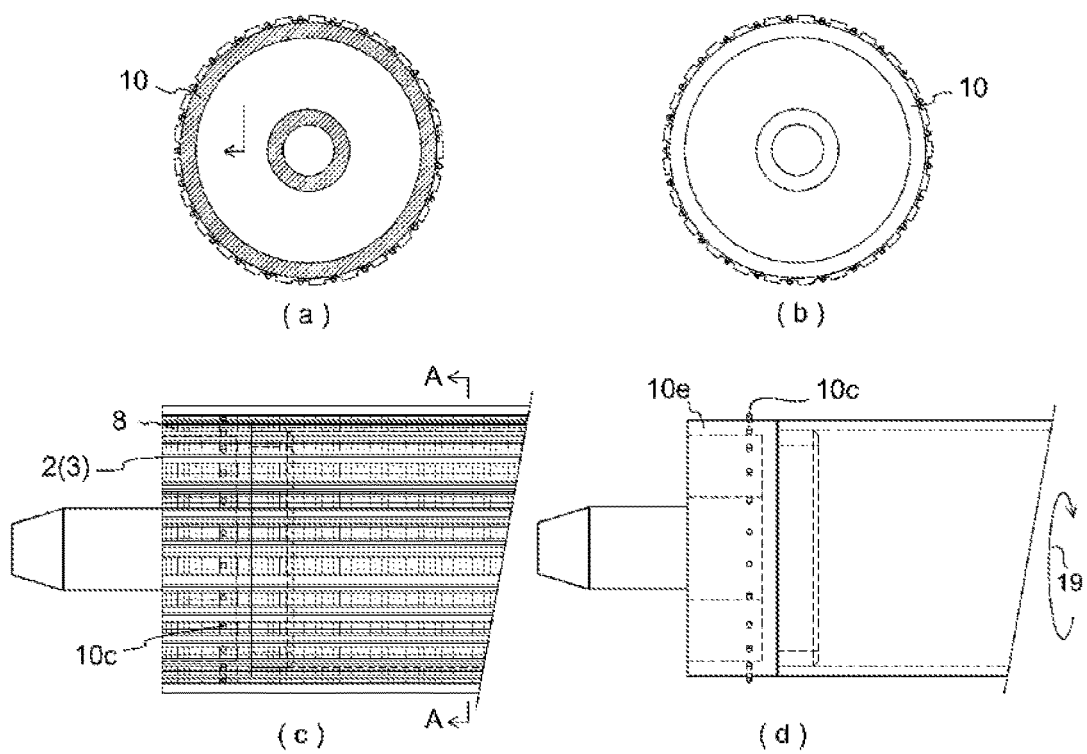

[FIG. 17]
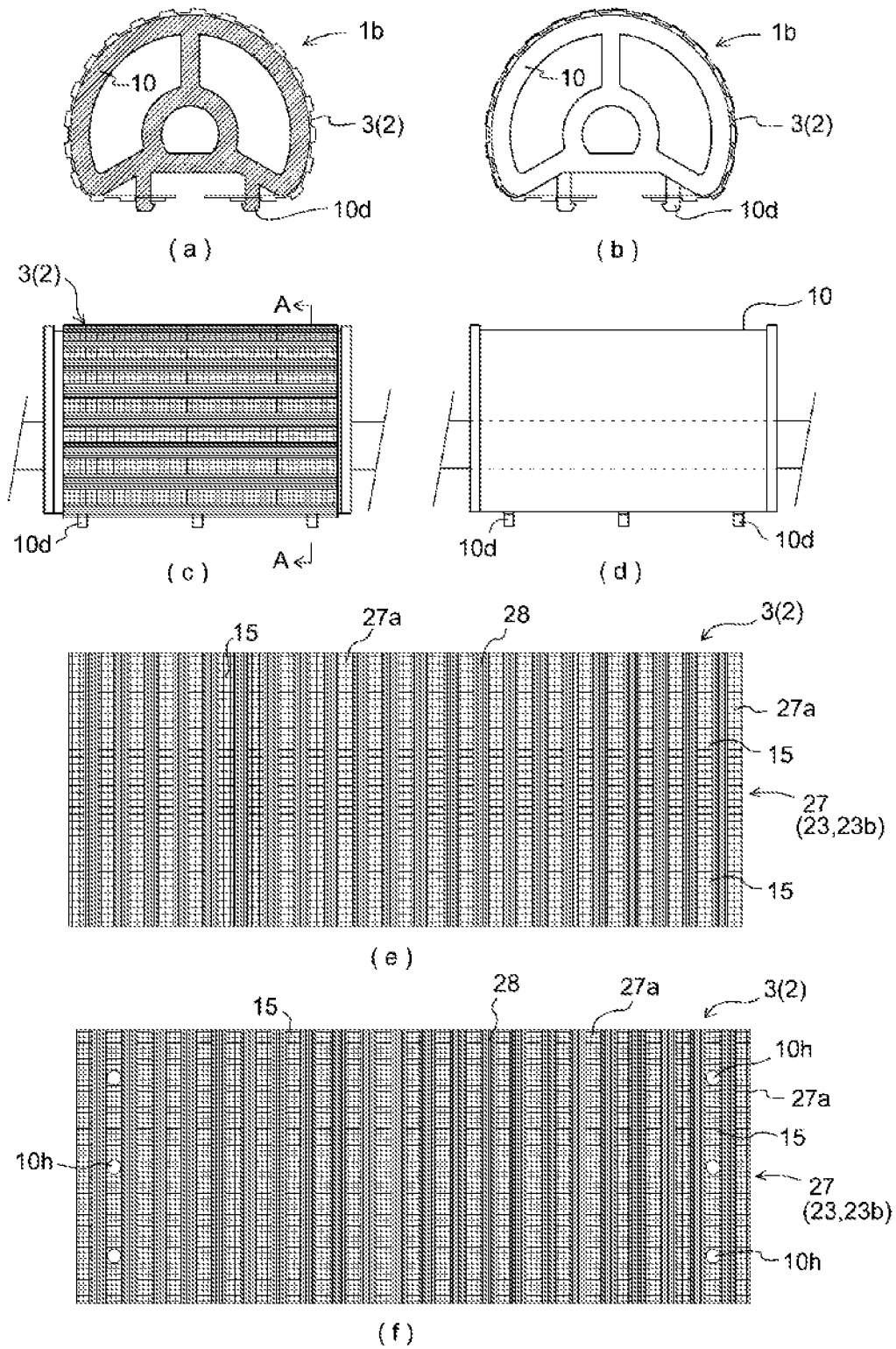

[FIG. 18]
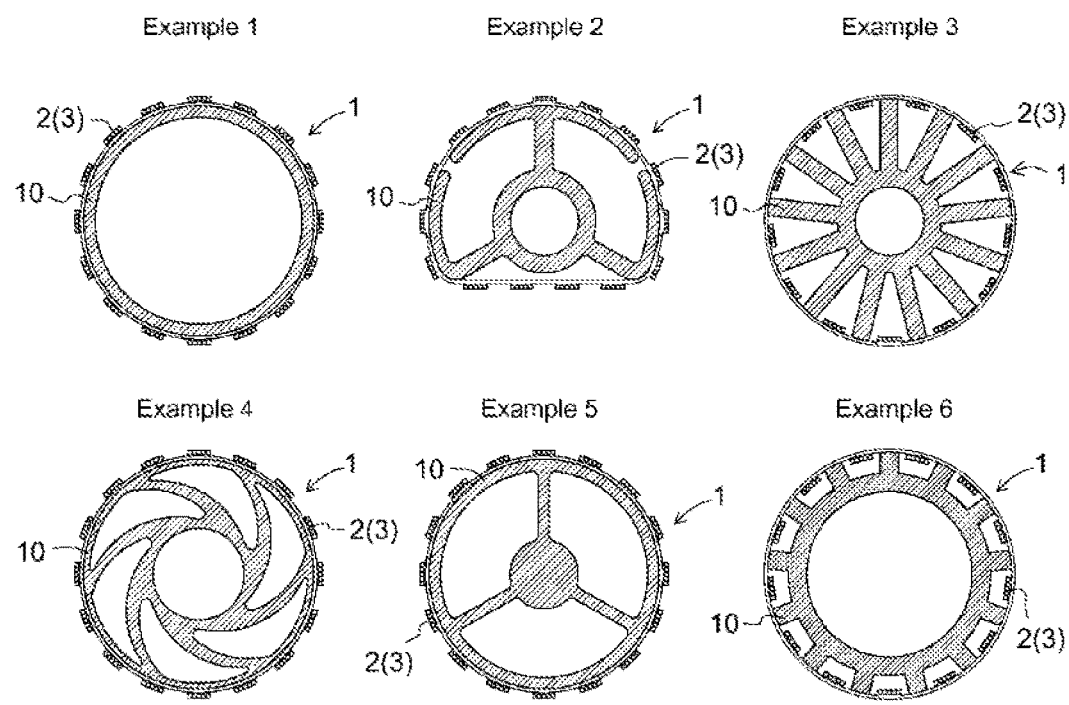

[FIG. 19]
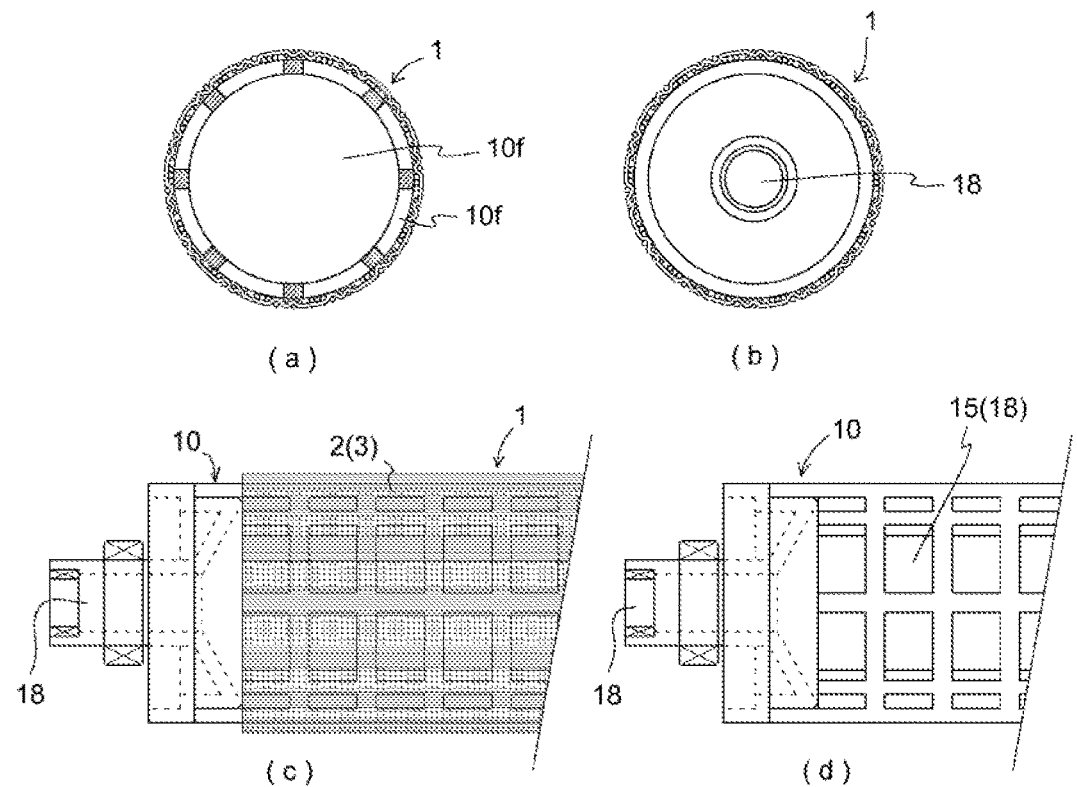
[FIG. 20]
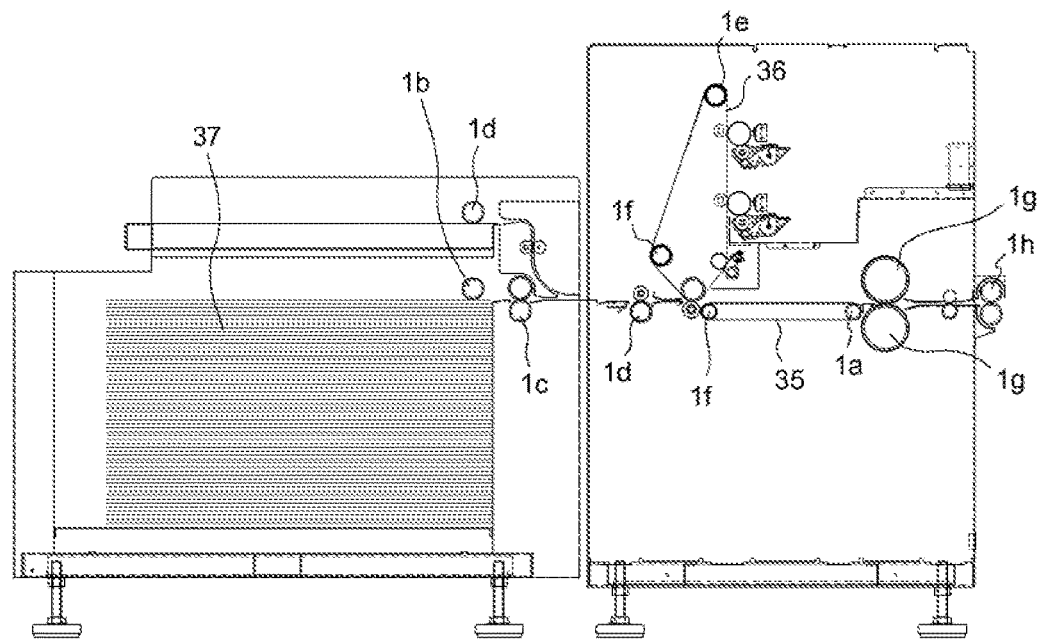

[FIG. 21]
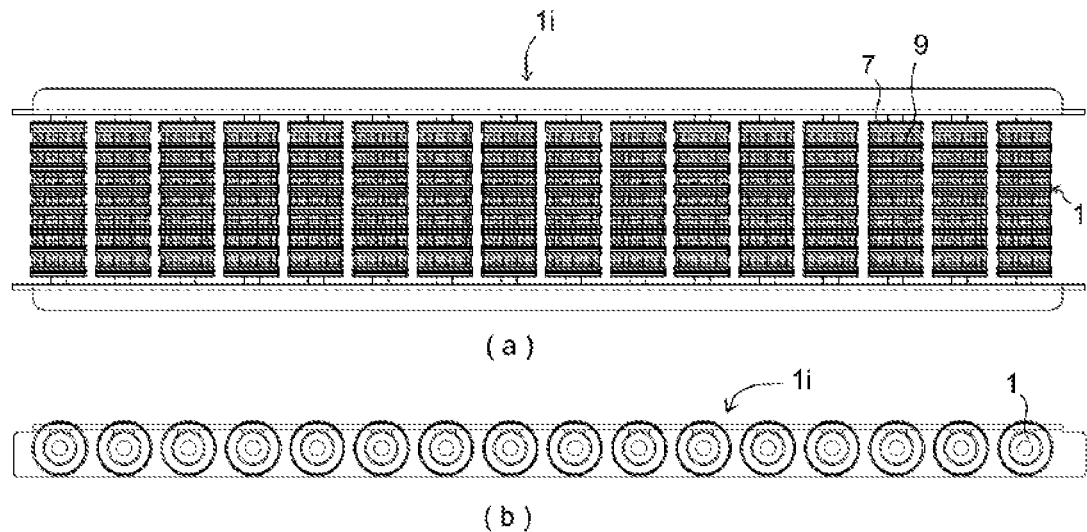
(a)
(b)
[FIG. 22]
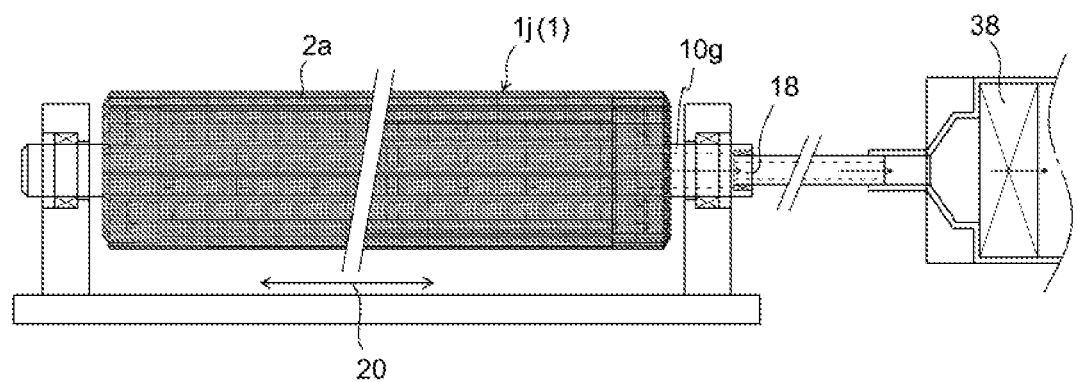

[FIG. 23]
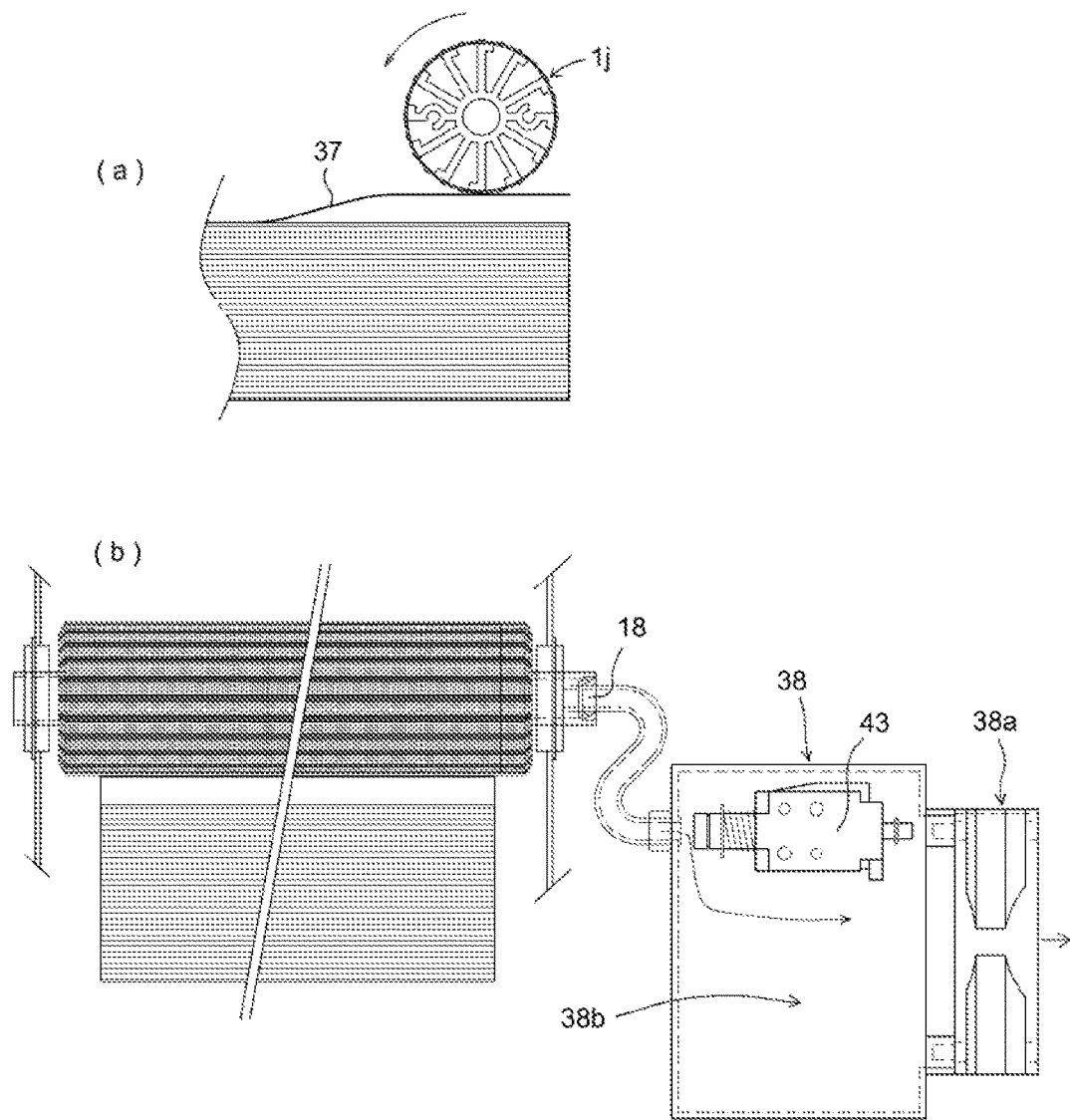

[FIG. 24]
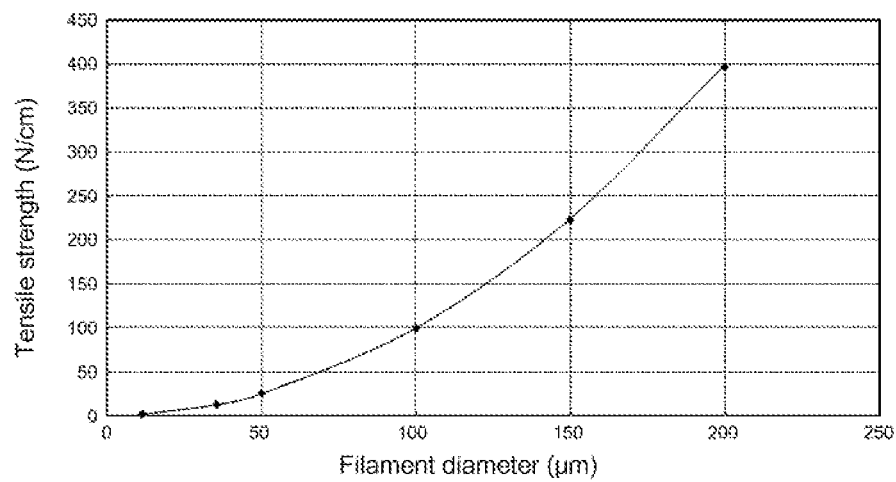
[FIG. 25]
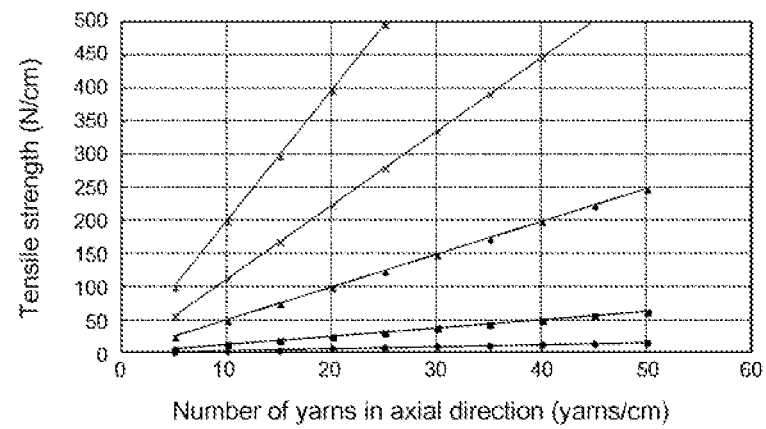

[FIG. 26]
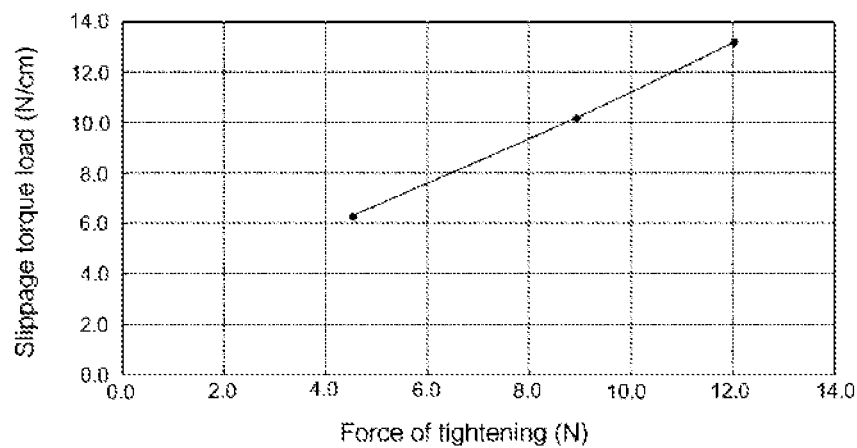
[FIG. 27]
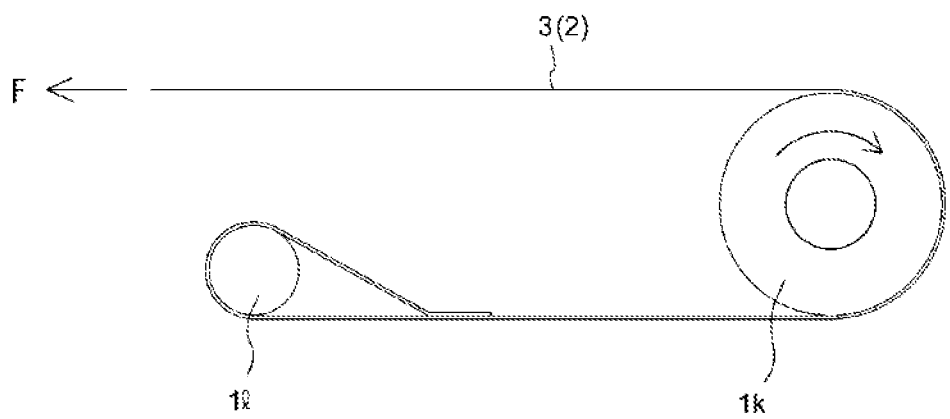

[FIG. 28]
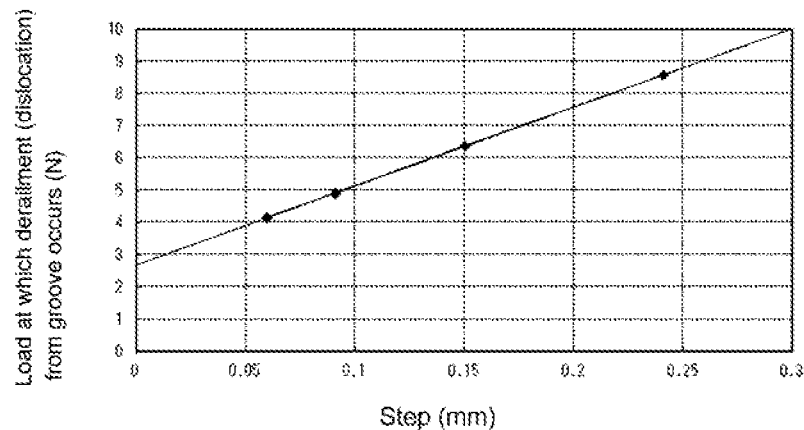
[FIG. 29]
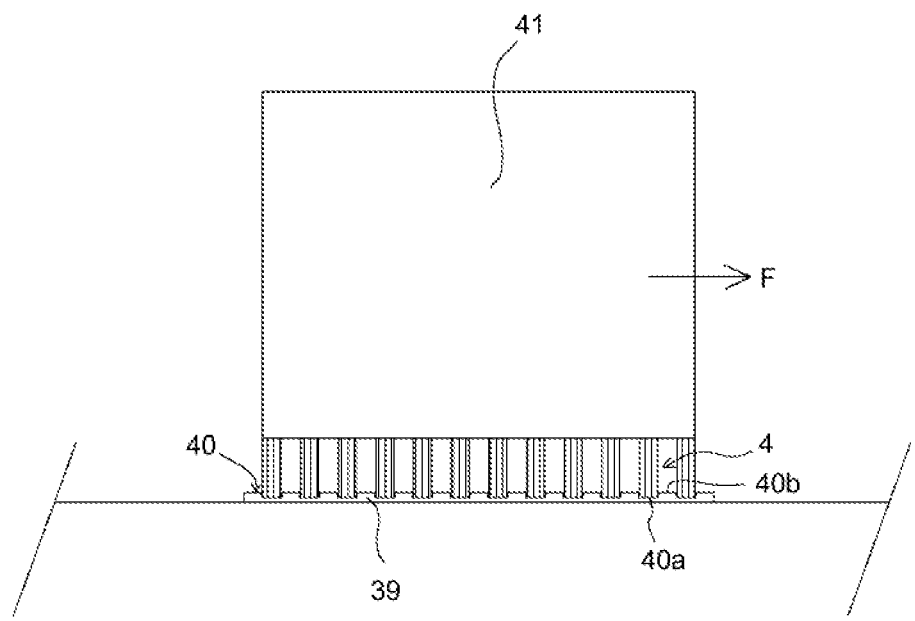

[FIG. 30]
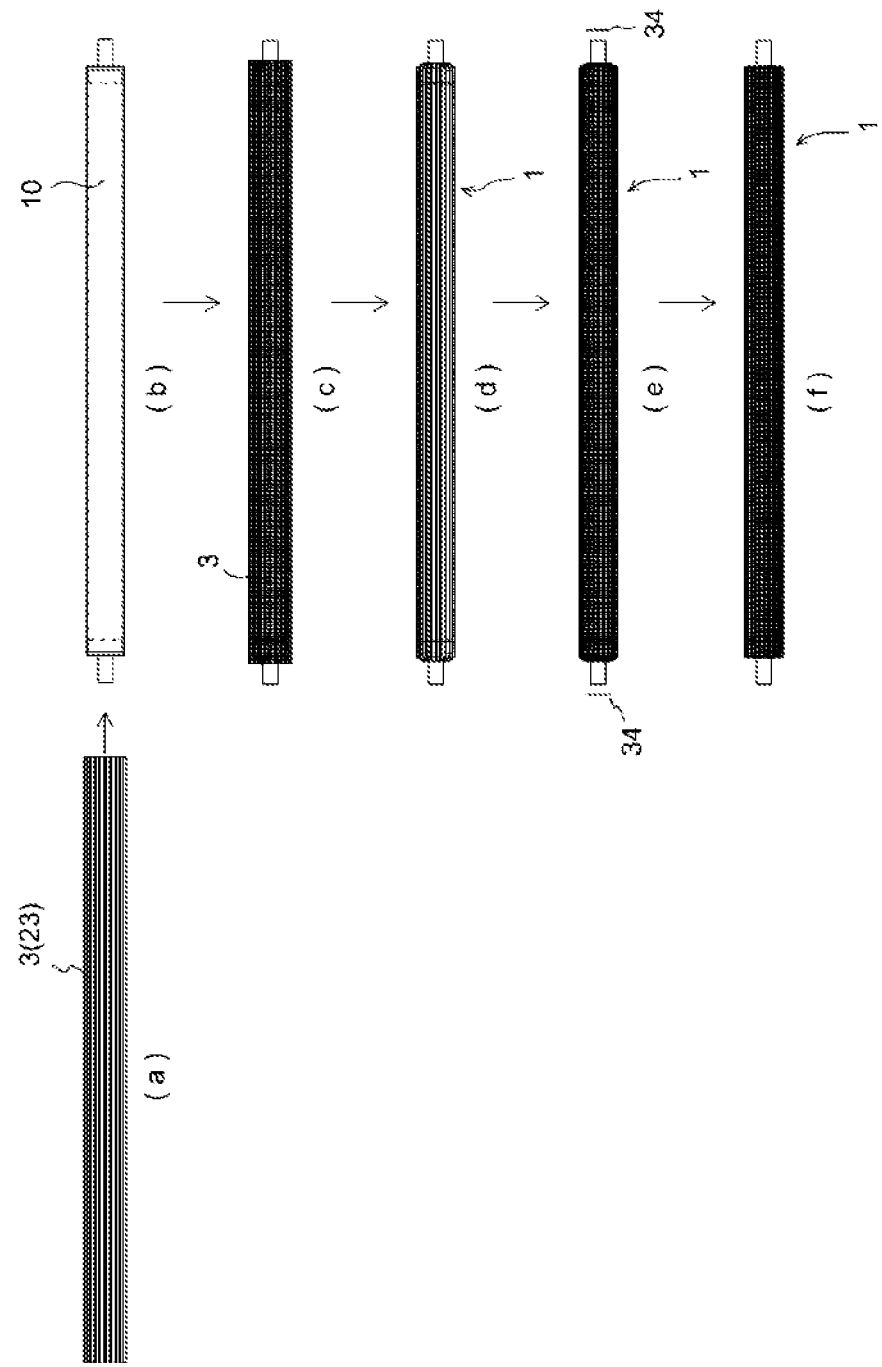

ROLLER COVERED WITH COVERING COMPRISING WOVEN FABRIC, AND APPARATUS EMPLOYING SAME

TECHNICAL FIELD

The present invention relates to a roller for moving or conveying sheet-shaped paper, cloth, film, or the like, and to an apparatus employing such a roller; and in particular, in the context of a roller that sucks dust or the like while rotating or to an apparatus employing such a roller, relates to a roller for which friction at a surface thereof is required or a roller for which suction or cooling and possession of air permeability are required, as well as to an apparatus employing such a roller; for example, a roller employed in any of various types of printing apparatus, coating apparatus, calendaring apparatus, slitter apparatus, laminating apparatus, textile processing apparatus, packaging apparatus, automatic cash dispenser, or other such conveyor apparatus or the like comprising a belt conveyor or roller conveyor as well as to an apparatus employing such a roller.

BACKGROUND ART

Conventionally, rollers covered with resin tubes or fiber-like substances have been used as rollers in conveyors and other such conveyor apparatuses and as rollers in conveyor units in printing apparatuses. Furthermore, among the rollers which are employed for feed, movement, or conveyance of sheet-like objects through utilization of friction, solid rubber rollers which have high coefficient of friction are usually employed. Where such a roller conveys a conveyed object in the form of sheet-like paper, film, fabric, or the like, paper dust, dust, fibrous waste, and the like will adhere to the surface of the roller, causing degradation of conveyance characteristics. To address this, rollers in which recesses and projections are provided at the surface of the roller and the like have been proposed, these being employed in a variety of apparatuses. Furthermore, to prevent paper dust, dust, fibrous waste, and the like from adhering to the roller surface, rollers covered with tubes comprising fluorocarbon resin having low coefficient of friction, and apparatuses that clean surfaces of rollers on which paper dust, dust, fibrous waste, and the like has adhered, have been developed.

Moreover, as suction rollers having air permeability for cooling or suction, rollers having a multiplicity of suction holes formed at the surface thereof and rollers which are cylindrical bodies having a multiplicity of slits formed therein and which are formed such that fibril-like material is wound thereabout have been developed, these being used as rollers in apparatuses for manufacture of resin film and/or sheet. It so happens that in connection with rotary presses which are printing apparatuses, from the standpoints of improvement of quality and improvement of productivity, and from the standpoint of maintaining a clean environment as well, apparatuses and rollers capable of conveying printed matter without coming in contact with the surfaces of the printed matter that are coated with ink are desirable.

On the other hand, as a paper feed apparatus for a printer, an apparatus comprising a cover member made of woven cloth has for example been proposed in which an outer surface of a shell is coated with a low-friction material, this is further covered with a cover member made of woven cloth, this cover member made of woven cloth is impregnated with an ink-adhesion-preventing agent and is moreover formed into the shape of a cylindrical seamless sleeve having open ends (see, for example, Patent Reference No. 1).

Moreover, as a roller for conveying that can be easily covered by anyone and that is capable of being manufactured at low cost, a cover has been proposed in which yarn comprising heat-shrinkable fiber that has been coated with silicone resin having plentiful lubricity, mold-releasability, and wear resistance is employed to manufacture a seamless tube comprising knit fabric, braided fabric, or woven fabric, this seamless tube being used to cover the outside circumference of a roller core (see, for example, Patent Reference No. 2).

Moreover, there has been a proposal in which water-soluble polyvinyl alcohol fibers are stranded together in a reversible pattern to form a cylindrical knit fabric, this cylindrical knit fabric being used as cover material to cover a roller for conveying magnetic tape (see, for example, Patent Reference No. 3).

Furthermore, in the context of a roller for conveying plate glass which has been softened by heating, to achieve increase in the life of a sleeve comprising fiber knit fabric which covers a roller core member and reduction in plate glass manufacturing and processing cost, a glass conveying roller has been proposed which is a roller for conveying plate glass which has been softened by heating and in which a sleeve comprising knit fabric made of heat-resistant inorganic fiber is used to cover the outside circumference of a roller core member, a protective covering moreover being arranged at the surface of said sleeve (see, for example, Patent Reference No. 4).

Moreover, a conveying roller ensuring interfacial peel strength has been proposed which is a conveying roller that, even without use of adhesive, has adequate required interfacial peel strength between a metal core and a fluorocarbon resin tube, and in which, in causing the outside circumferential surface of the metal core to be covered by a heat-shrinkable tube made of fluorocarbon resin, at the outside circumferential surface of this metal core, taking the outer contour in the circumferential direction of the metal rod stock constituting the metal core starting material as an imaginary line, groups of peak-like ridges that protrude beyond this imaginary line are formed in regular fashion in a parallel state on the outside circumferential surface of the metal core, at which time the depth of the valleys between mutually adjacent groups of peak-like ridges is made to be at least 0.05 mm, as a result of which the conveying roller is such that interfacial peel strength is ensured even when adhesive is not used in combination therewith, permitting achievement of prevention of dislocation and improvement in productivity (see, for example, Patent Reference No. 5).

Moreover, a suction roller has been proposed which is a cylindrical body having a multiplicity of slits formed with fibril-like material wound thereabout, and formed such that engaged with this cylindrical body is a tubular object comprising wire mesh, screen, nonwoven fabric, woven fabric, or paper comprising synthetic fibers or natural fibers, or plastic or metal which is porous (see, for example, Patent Reference No. 6).

Furthermore, a sheet conveyor apparatus has been proposed for increasing intimacy of contact between a suction roller and a sheet traveling along the outside circumferential surface thereof, for permitting definitive correction of positional dislocation due to travel, and for causing offset defects not to be produced, which is a sheet conveyor apparatus equipped with a suction roller that supports a moving and traveling sheet at the outside circumferential surface thereof, this suction roller being such that formed at the outermost peripheral surface region of a cylindrical roller made of metal there is a mesh cylinder in which a multiplicity of suction holes of diameter not greater than 1 mm are formed through creation of openings by means of etching (see, for example, Patent Reference No. 7).

Moreover, a roller has been proposed which comprises a rubber elastic body in which a multiplicity of grooves for attenuation of wear are formed at the outside circumferential surface of a roller that comes in contact with a sheet-shaped article (see, for example, Patent Reference No. 8).

As indicated at the foregoing Patent References, cover materials for rollers include woven fabric, paper, nonwoven fabric, wire mesh, and knit fabric, as well as rubber tubing, shrink tubing, and so forth. Furthermore, cover materials on which coating or other such treatment has been carried out, coverings comprising heat-resistant materials, knit fabrics in which elastomers have been embedded, and the like have been developed. However, with conventional coverings, where the covering is constituted from a fibrous or filamentous substance, rubbing contact with the conveyed object and compression under load has caused occurrence of fraying due to breakage of filaments, and as this fraying has progressed it has caused occurrence of problems affecting conveyance characteristics and other such functions. Furthermore, with such rollers, for maintenance of gripping characteristics or surface protection, coating treatment is carried out in which a coating agent is used to impart the surface of the roller with a coating layer, so as to improve the coefficient of friction or protect the underlying fabric. However, where coatings are employed, sliding contact causes the coating layer to wear, as a result of which there is the problem that life is shortened. To increase life, it therefore becomes necessary to increase the thickness of the coating layer, as a result of which there is the problem that manufacturing cost is increased.

With rollers covered with the foregoing rubber tubing, shrink tubing, and other such covering materials, tubing materials include fluorinated-type, polyolefin-type, and silicone-type, as well as PET, PVC, rubber-type (EP rubber), and so forth, and there is also woven fabric, knit fabric, and so forth. Where tubing comprising such materials is employed there will be the problem of achieving adhesion to the core. For adhesion to the core, heat-shrinkable tubing which is made to contract through use of heat is therefore typically used. In addition, where lubricity or the like are required at the surface, resin-type heat-shrink tubing is employed; and in particular where low coefficient of friction is required, fluoro-type heat-shrink tubing is employed. Furthermore, where gripping characteristics are required at the surface, rubber-type tubing is employed.

Where such resin-type heat-shrink tubing is employed, circumstances related to tubing manufacturing method ordinarily cause the surface to be slippery and to have poor gripping characteristics. They are therefore not suited for applications where conveyed objects are conveyed under low load. But in apparatuses where rollers acting together form a nip at high load to allow gripping force to be obtained, resin-type heat-shrink tubing is often used. Moreover, because fluoro-type and silicone-type resin tubings are heat-resistant, these are employed in rollers that undergo heating. However, with rollers employing such resin tubing, because circumstances related to manufacture of the tubing cause the inner and outer surfaces to be slippery, while they are appropriate as rollers where smooth surfaces are required, occurrence of slipping and the like can result in feed nonuniformities in applications where conveying occurs with nips at low loads. Moreover, where scratches or the like appear on the tubing, contaminant adheres to such scratches, as a result of which defects are produced on the conveyed object. Coverings for rollers requiring recesses and projections at the surface thereof do not lend themselves to manufacturing methods.

Furthermore, where tubing comprising woven fabric and/or knit fabric is employed, heat-shrink material is employed at the yarn and heat-shrinking is carried out to achieve intimate contact, but there is the problem that there is fraying of yarn at the end faces, as a result of which there is the issue that processing must be carried out at the end faces, meaning that processing at the end faces is required. Moreover, conventional woven fabric coverings are constituted from a single weave pattern, and so such coverings cannot accommodate diverse rollers. With a knit fabric covering, being basically caused by the shape of loops of yarn, there is stretchability due to deformation of loops, this being characteristic of knit fabrics, and so where a knit fabric is to be used as a covering for a roller, some means will be necessary to control stretchability caused by such deformation of loops.

Next, with rollers used for ventilation, for cooling, or for suction, because holes are ordinarily formed on the surface of the roller, there is the problem that processing costs for carrying this out are high. To address this, Patent Reference No. 6 discloses a suction roller in which there is a roller produced by winding a fibril-like material about the surface of a cylindrical body on which a multiplicity of slits have been formed, and screen, nonwoven fabric, woven fabric, or paper comprising synthetic fiber or natural fiber, or a porous substance comprising plastic or metal which covers and engages with the outside surface of the cylindrical body. However, where a covering comprising ordinary woven fabric covers and engages with a cylindrical body, with conventional mesh-like woven fabric having air permeability, as this is nothing more than the intersections of warp yarn and weft yarn, there is a tendency for occurrence of fraying due to breakage of yarn and of runs in the material as a result thereof and there is moreover a need to carry out prevention of fraying at the open ends of the cylindrical covering. Also, because it is constituted in mesh-like fashion, its properties will depend on the strength of a single yarn. Furthermore, in the context of a suction roller for carrying out suction, to carry out conveyance without damaging the surface of a sheet, there is the foregoing fraying prevention method and disclosure of the foregoing Patent Reference No. 7 with holes provided at the surface by etching. Thus, with suction rollers, problems include damage to the surface of the sheet, positional dislocation during travel due to conveyance, offset defects, and so forth, as a result of which fabrication of micropores, damage to the roller surface, burrs, and so forth are problems. These have also therefore been a factor in increasing cost as attempts have been made to improve the foregoing.

Moreover, with conventional ordinary rubber rollers which are rollers employed for conveyance or feeding of paper and the like, rubber rollers made up of rubber layer(s) at the surface thereof have such problems as the fact that gripping characteristics with respect to paper deteriorate due to contamination at the surface as a result of paper dust or the like and wear of the surface, and the fact that there will be misfeeds and so forth in accompaniment to this deterioration in gripping fabrication. This being the case, in order to address this, a construction has been adopted in which recesses and projections are provided at the surface of the rubber roller, or improvements have been made to the rubber material. Moreover, because the surface is solid, there has been the problem that it has been impossible to avoid contamination of the rubber surface, some apparatuses even being provided with a member which carries out cleaning of the roller surface. Conventional rollers thus include a wide variety of rollers, and roller mechanisms compatible with applications are known. In addition, apparatuses for which conservation of resources, conservation of energy, recycling, and low cost are desired, as well as rollers and roller mechanisms for use with such apparatuses, have in recent years become necessary. What is more, due to the fact that in the conventional art there is no technology that has been established which can accommodate the low-variety/small-lot-size style of production that has come to be seen in recent years, each time that a roller is to be fabricated it has been necessary to first develop a suitable manufacturing method.

PRIOR ART REFERENCES

Patent References

Patent Reference No. 1: Japanese Patent Application Publication Kokai No. H03[1991]-71848
Patent Reference No. 2: Japanese Patent Application Publication Kokai No. H10[1998]-204779
Patent Reference No. 3: Japanese Utility Model Application Publication Kokai No. S62[1987]-100956
Patent Reference No. 4: Japanese Utility Model Application Publication Kokai No. H05[1993]-45034
Patent Reference No. 5: Japanese Patent Application Publication Kokai No. 2007-254141
Patent Reference No. 6: Japanese Patent Application Publication Kokai No. H08[2006]-239146
Patent Reference No. 7: Japanese Patent Application Publication Kokai No. H09[1997]-67053
Patent Reference No. 8: Japanese Patent Application Publication Kokai No. H08[1996]-53251

SUMMARY OF INVENTION

Problem to be Solved by Invention

A problem to be solved by the present invention is to eliminate the various problems with the rollers which are rotating support members used in the foregoing conventional apparatuses as well as apparatuses that use those rollers, and to provide rollers comprising woven fabrics for use in a variety of apparatuses which achieve conservation of resources, conservation of energy, recycling, and low cost as well as apparatuses that employ such rollers.

Means for Solving Problem

Of the means in accordance with the present invention for solving the foregoing problems, a first means is a means in the context of a roller provided with a covering comprising woven fabric at a surface thereof. This roller is a roller that conveys a sheet or an object, a roller that supplies a sheet or an object, a roller that drives a belt, a roller that moves in idler fashion in accompaniment to movement of a sheet or an object, a roller that uses air to cool or dry a moving sheet or object, a roller that subjects a sheet or object to suction, or a roller that is opposed to another roller and that is employed as a roller which cleans a surface against which it is pressed. Woven fabric constituting the covering is provided at the surface of such roller(s). It is a roller provided with woven fabric at a surface thereof which is characterized in that this woven fabric is woven fabric produced by variation of weave pattern or combination of weave patterns, comprising a weave pattern forming a pattern in a more or less linear pattern of bands or at least two different patterns, and constituted from a gap-forming portion that is a region forming a more or less rectangular pattern in which warp yarn and weft yarn of said weave pattern cause formation of lattice-like open holes or a more or less rectangular pattern that controls air permeability and a non-gap-forming portion that is a region forming a more or less rectangular pattern in which yarns of the woven fabric mutually approach or come in contact.

In accordance with a second means, the gap-forming portion and the non-gap-forming portion of the woven fabric constituting the covering provided at the surface of the roller is formed in a pattern chosen from among variation of a plain weave pattern, variation of a twill weave pattern, variation of a satin weave pattern, combination of satin weave and plain weave patterns, combination of satin weave and twill weave patterns, and combination of plain weave and twill weave patterns. This non-gap-forming portion is a region formed so as to be, in the thickness direction thereof, of the same thickness as the gap-forming portion or thicker than the thickness of the gap-forming portion; and the covering comprises woven fabric in which the gap-forming portion and the non-gap-forming portion are formed in adjacent and alternating fashion in an axial direction or the gap-forming portion and the non-gap-forming portion are formed in adjacent and alternating fashion in a rotational direction. The woven fabric forming this covering has a width of the gap-forming portion and a width of the non-gap-forming portion and a pitch, a step which is a difference in thicknesses at the gap-forming portion and the non-gap-forming portion, an opening ratio of lattice-like holes at the gap-forming portion, or a forming portion angle at which the gap-forming portion and the non-gap-forming portion are formed relative to the rotational direction which is compatible with a function of the roller in an apparatus in which it is employed due to constitution of the yarn and the variation of the weave pattern or the combination of the weave patterns. It is a roller provided with woven fabric at the surface thereof in accordance with the first means characterized in that it comprises a covering which has been made to undergo processing, performed on the yarn of such woven fabric(s) or a material from which said yarn is constituted or the woven fabric(s), in correspondence to the weave pattern and the yarn with which it was woven, chosen so as to be compatible with the function of the roller.

In accordance with a third means, the step which is the difference in thicknesses at the gap-forming portion and the non-gap-forming portion is due to means making use of a difference between a yarn diameter of the warp yarn used in the gap-forming portion and a yarn diameter of the warp yarn used in the non-gap-forming portion, or means making use of a difference in flattening of multifilament at soft-twist multifilament yarn comprising a plurality of fibers at the warp yarn. In addition, at least one means is used such that this difference or these differences permit formation of the difference in thicknesses at the gap-forming portion and the non-gap-forming portion in the woven fabric. Moreover, it is a roller provided with woven fabric at the surface thereof in accordance with the second means characterized in that the opening ratio of the gaps at this gap-forming portion is such that the sizes of the lattice-like holes are formed by means making use of yarn densities of the warp yarn and the weft yarn in the gap-forming portion, means making use of the flattening of the yarn at the soft-twist multifilament yarn at the gap-forming portion, or means making use of the yarn diameter of the warp yarn and the yarn diameter of the weft yarn in the gap-forming portion, at least one means being employed to constitute the gaps in the gap-forming portion with the opening ratio at these lattice-like holes; and the woven fabric which is the covering provided at the surface of the roller has the gaps in the gap-forming portion and the steps which are required in correspondence to the function.

In accordance with a fourth means, the woven fabric constituting the covering provided at the surface of the roller is cylindrical woven fabric or sheet-like woven fabric, is woven fabric prepared so that it has a coefficient of friction which is required at the surface of the roller, and is woven fabric in which the step between the gap-forming portion and the non-gap-forming portion is formed as necessary. It is a roller provided with woven fabric at the surface thereof in accordance with the third means characterized in that this woven fabric is such that the coefficient of friction which is a necessary surface condition at the surface at the roller is made to be a coefficient of friction due to the yarn employed at the woven fabric, or the coefficient of friction is made to be a coefficient of friction required for the function of the roller as a result of use, at least at the yarn in the region where there is the approach or the coming in to contact, of yarn which includes a material that controls coefficient of friction; processing is carried out before or after the covering is installed thereon through use of yarn that includes fiber to prevent fraying of yarn, the roller having undergone processing for prevention of fraying; and dislocation prevention means have been employed which prevent the covering from undergoing dislocation in the axial direction and dislocation in the rotational direction due to rubbing and compression when the roller is rotating.

In accordance with a fifth means, this is a roller provided with woven fabric at the surface thereof in accordance with any one means among the second through fourth means characterized in that the step between the gap-forming portion and the non-gap-forming portion is constituted by stripes in the pattern of the bands or the at least two different patterns; the roller employs fraying prevention means by which prevention of fraying of the yarn is such that prevention is carried out at the surface of the rotating support member or the woven fabric; dislocation prevention means are present which prevent the covering from undergoing dislocation in the axial direction and dislocation in the rotational direction due to rubbing and compression when the roller is rotating; the means for preventing fraying of the yarn of the covering is fraying prevention means making use of thermoplastic deformation or plastic deformation due to stress on the yarn, fraying prevention means making use of adhesive or coating agent, or fraying prevention means making use of thermal welding through inclusion of low-melting-point hot-melt yarn within the yarn of the woven fabric, the woven fabric being such that at least one fraying prevention means being employed such that fraying of the yarn is prevented; the means for preventing dislocation of the covering from the rotating member is means for preventing dislocation of the covering from the rotating support member making use of a gripping force comprising a force of tightening which is a force of contraction or a force of stretching of the woven fabric and friction between the covering and the rotating support member at the covering, dislocation prevention means making use of a force of contraction or a force of stretching of the woven fabric and protrusions constituting roughness of the surface of the rotating support member, dislocation prevention means making use of a projection at the covering and a recess at the rotating support member, dislocation prevention means making use of mesh-like gaps in the woven fabric constituting the covering and protrusion-like regions or hook-like regions on the rotating support member that engage therewith, dislocation prevention means making use of adhesion or thermal fusing, or dislocation prevention means making use of an antirotation member, the roller being such that dislocation between the covering and the rotating support member is prevented as a result of employment of at least one dislocation prevention means; and being such that prevention of fraying of the yarn by the fraying prevention means and prevention of dislocation with respect to the rotating support member by the dislocation prevention means are carried out.

In accordance with a sixth means, this is a roller provided with woven fabric at the surface thereof in accordance with the fifth means characterized in that the means for preventing dislocation of the covering from the rotating support member making use of the gripping force comprising the force of tightening which is the force of contraction or the force of stretching of the woven fabric and friction between the covering and the rotating support member at the covering is means for preventing dislocation of the covering in which the surface of the rotating support member is covered with a material that is different from the covering and that is a material that comprises an elastic body having a coefficient of friction higher than the coefficient of friction of the woven fabric and in which the gripping force is obtained from the force of tightening due to the force from stretching or the force from heat-shrinking the woven fabric and this rotating support member, means for preventing dislocation of the rotating support member and the covering in which the gripping force is obtained from the force of tightening due to heat-shrinking or tension due to stretchability of the woven fabric which is such that elastic fiber having high coefficient of friction and having stretchability is included in the yarn comprising a plurality of filaments used in the woven fabric constituting the covering and friction of the rotating support member and this elastic fiber, means for preventing dislocation of the covering making use of the protrusions on the rotating support member on which the protrusions are formed so as to be lower in height than the thickness of the gap-forming portion in the woven fabric and engagement with the lattice of the gap-forming portion of said woven fabric or contact of said protrusions and said woven fabric, means for preventing dislocation of the covering making use of engagement between the projection at the satin weave portion of the woven fabric and the recess at the rotating support member, means for preventing dislocation making use of engagement between the hook-like regions or the protrusion-like regions provided on the rotating support member and the holes formed by machining of the woven fabric, means for preventing dislocation of the covering in which the covering antirotation member is provided at an end of the roller, means for preventing dislocation of the rotating support member and the covering operating by means of thermal fusing making use of heating and such that thermally fusible fiber or yarn including thermally fusible fiber is used at the yarn of the woven fabric constituting the covering as a result of thermal action, means for preventing dislocation of the rotating support member and the covering in which pressure-sensitive adhesive or non-pressure-sensitive adhesive constituting physical action or chemical action is provided on the rotating support member, or means for preventing dislocation of the covering in which the covering is compressed by the antirotation member at an end face of the roller, at least one dislocation prevention means being employed to prevent the covering from being dislocated from the rotating support member as it rotates.

In accordance with the seventh means, this is a roller provided with woven fabric at the surface thereof in accordance with the sixth means characterized in that the woven fabric constituting the covering comprises yarn comprising artificial fiber extending in the direction of rotation of the rotating support member and yarn selected from any among covered yarn formed covering filament other than elastic fiber with elastic fiber, yarn having multiple plies which is twisted yarn formed by soft-twisting elastic fiber with filament different from elastic fiber, yarn comprising crimped fiber, yarn comprising heat-shrinkable fiber, and yarn including thermally fusible yarn comprising low melting point; the woven fabric is heat-shrinkable or stretchable in the direction of rotation of rotating support member; the yarn extending in the axial direction of this woven fabric is selected from at least two yarns among yarn which is such that yarn used at the satin weave portion and the plain weave portion or the twill weave portion comprises nonstretchable monofilament, yarn comprising nonstretchable multifilament, yarn including thermally fusible yarn comprising low melting point, yarn comprising elastic fiber having high coefficient of friction, and yarn comprising yarn including elastic fiber having high coefficient of friction, the yarn including nonstretchable filament or the nonstretchable yarn thereamong being employed at at least the yarn extending in the axial direction of the rotating support member to produce the woven fabric in which stretching in the axial direction of the rotating support member is controlled, this woven fabric being made to serve as the covering at the surface of the rotating support member.

In accordance with the eighth means, this is a means in the context of the roller at which the covering comprising woven fabric is provided at the surface of the rotating support member in accordance with any one means among the first through the seventh means, and in accordance with this means, this is an apparatus employing the roller at which the covering comprising woven fabric is provided at the surface of the rotating support member characterized in that said roller is made to be supply means, conveyance means, drive means, cooling means, suction means, or cleaning means at the apparatus, at least one means among these means being employed at the apparatus.

Benefit of the Invention

The present invention is a roller in which the surface of the roller is covered with a covering comprising woven fabric, the woven fabric constituting the covering which is provided at the surface of this roller being a covering which is woven fabric formed from at least two patterns or a pattern which is a pattern of bands in a constitution in which gaps in this woven fabric are formed so as to be compatible with a function for which the roller is employed, being woven fabric produced by variation of weave pattern or combination of weave patterns, this covering being employed such that a portion of the woven fabric which is a non-gap-forming portion which is woven in a more or less rectangular shape and in which yarns mutually approach or come in contact and a portion of the woven fabric which is a more or less rectangular gap-forming portion forming a pattern of bands or at least two patterns are constituted in adjacent fashion in the direction of rotation of the roller, the woven fabric which covers the surface of the roller being such that recesses and projections may be provided at the woven fabric due to a difference in flattening of yarn(s), or due to thicknesses of yarns being such that there are respectively different yarn diameters when a plurality of yarns are employed, permitting the roller to be made such that recesses and projections produced by the woven fabric are formed at the surface of the roller as necessary.

Moreover, where the woven fabric has undergone an operation to prevent fraying of yarn due to breakage of yarn, rubbing, or the like, strength is adequately improved in a constitution in which the woven fabric has been imparted with strength or a constitution in which the woven fabric tends not to mar conveyed objects and/or there is prevention of fraying of yarn due to rubbing or the like during rotation, or, where gripping is required at the surface, where this is made to be a woven fabric woven such that elastic fiber having high coefficient of friction is included within the yarn, or woven fabric woven using yarn having elastic fiber of high coefficient of friction at the yarns which mutually approach or come in contact where yarn density is high, causing this woven fabric to be provided at the surface of a roller makes it possible to achieve a roller having a high coefficient of friction, which is more conservative of resources than the rubber rollers and other such rollers comprising solid members that have conventionally been employed where coefficient of friction has been required, making it possible to reduce roller weight and permitting contribution to conservation of energy at the apparatus. Or conversely, in rollers where low coefficient of friction is required, it is possible to constitute a roller having low coefficient of friction by adopting a woven fabric constitution or a yarn constitution that causes reduction in the area over which contact is made or by employing materials comprising fluorocarbon resin which has low coefficient of friction as material of the yarn.

Moreover, where a roller is provided with a covering at the surface of the roller under conditions that do not involve adhesion or thermal fusing, it will be possible in the event that the end of life is reached due to wear or the like at the surface of the covering to replace only the woven fabric serving as covering at the surface while leaving the rotating support member serving as the core where it is so that it may continue to be used. Furthermore, by causing a covering comprising woven fabric to be provided at a rotating support member which rotates it will be possible to achieve a constitution in which scratches, offset defects, and the like tend not to occur even in apparatuses in which conditions are severe in terms of possibility for occurrence of scratches, offset defects, and the like on conveyed objects, and with respect to manufacturing cost as well, inasmuch as it is merely a matter of causing arrangement thereof at the rotating support member it will be possible to achieve supply thereof at low cost, and being a roller which allows conservation of resources, conservation of energy, recycling, and low cost, this roller is capable of being employed in an apparatus having supply means, paper feed means, conveyance means, drive means, cooling means, drying means, or suction means at the apparatus, or in powder cleaning means, and it will be possible to adopt the foregoing for provision in the form of a supply roller at means for supplying sheets, a pickup roller or feed roller at paper feed means for feeding sheets, paper, or the like, an idler roller or a drive roller at means for conveying sheet-like objects, an idler roller or a drive roller that drives a belt or the like, a cooling roller that cools media possessing heat, a drying roller that carries out drying while rotating, a roller that subjects a conveyed object to suction or that sucks dust or the like from a transfer body surface, a cleaning roller at means for cleaning powder or the like, and so forth, and it will be possible provide apparatuses employing the foregoing.

BRIEF DESCRIPTION OF THE DRAWINGS

FIG. 1 Example showing in schematic fashion a roller covered with woven fabric having a pattern of lateral bands, (a) being a side view, and (b) being a partial front view.

FIG. 2 Example showing in schematic fashion a roller covered with woven fabric having a pattern of longitudinal bands, (a) being a side view, and (b) being a partial front view.

FIG. 3 Example showing in schematic fashion a roller covered in helical fashion in the direction of rotation by woven fabric comprising cylindrical weave, (a) being a side view, and (b) being a partial front view.

FIG. 4 Example showing in schematic fashion a roller having an air-permeable portion capable of cooling and/or suction which is covered with woven fabric that is cylindrical weave in which approximately one-half is a lattice-like pattern having gaps and approximately one-half is a pattern that does not form gaps, (a) being a side view, and (b) being a partial front view.

FIG. 5 Exemplary constitution at which varying a plain weave pattern causes formation of a non-gap-forming portion and a gap-forming portion in woven fabric provided at the surface of a roller, (a) being a plan view and (b) being a side view.

FIG. 6 Exemplary constitution at which combination of patterns in satin weave and plain weave or twill weave causes formation of a non-gap-forming portion and a gap-forming portion in woven fabric provided at the surface of a roller, (a) being a plan view and (b) being a side view.

FIG. 7 Exemplary constitution at which multifilament is employed at warp yarn which forms gaps so as to decrease gap size in woven fabric comprising a non-gap-forming portion and a gap-forming portion constituted as a result of variation in plain weave pattern, (a) being a plan view and (b) being a side view.

FIG. 8 Exemplary constitution at which multifilament is employed at weft yarn which forms gaps so as to decrease gap size in woven fabric having a non-gap-forming portion and a gap-forming portion constituted as a result of variation in plain weave pattern, (a) being a plan view and (b) being a side view.

FIG. 9 Exemplary constitution at which multifilament yarns comprising pluralities of fibers are employed at small-diameter warp yarn 26a and large-diameter warp yarn 26b in woven fabric having a non-gap-forming portion and a gap-forming portion constituted as a result of combination of patterns in satin weave and plain weave, (a) being a plan view and (b) being a side view.

FIG. 10 Example of use of yarn and example of combination of weave patterns, (a) being a sectional view and (b) being a plan view.

FIG. 11 Example of use of yarn, example of combination of patterns in satin weave and plain weave, and example of heat-shrinkability in the radial direction, (a) being a sectional view and (b) being a plan view.

FIG. 12 Example of use of yarn, example of combination of patterns in satin weave and plain weave, and example of stretchability or heat-shrinkability in the radial direction, (a) being a sectional view and (b) being a plan view.

FIG. 13 Example of prevention of fraying at open ends of heat-shrinkable cylindrical woven fabric which employs heat-shrink yarn at weft yarn, the upper portion of the drawing being the situation before heat-shrinking, where (a) is a sectional view and (b) is a partial front view; and the lower portion of the drawing being the situation after heat-shrinking, where (c) is a side view and (d) is a partial front view.

FIG. 14 Example of prevention of fraying and prevention of dislocation at ends of stretchable cylindrical woven fabric which employs stretchable yarn at weft yarn, the upper portion of the drawing being the situation after engagement with the stretchable cylindrical woven fabric, where (a) is a sectional view and (b) is a partial front view; and the lower portion of the drawing being the situation after retainer rings have been used to cause the ends of the cylindrical woven fabric to be brought into intimate contact with the ends of the rotating support member, where (c) is a side view and (d) is a partial front view.

FIG. 15 Example in which grooves in the axial direction of the rotating support member are provided and portions in satin weave serving as projections engage with these grooves to prevent dislocation of the woven fabric in the rotational direction, (a) being a sectional view, (b) being a side view, (c) being a partial front view, and (d) being a partial front view of the rotating support member.

FIG. 16 Example in which protrusions are provided at a flange of the rotating support member and the protrusions are made to mate with spaces in the woven fabric constituting the covering to prevent dislocation, (a) being a sectional view, (b) being a side view, (c) being a partial front view, and (d) being a partial front view of the rotating support member.

FIG. 17 Example of a situation in which woven fabric serving as covering is employed at pickup roller having semicircular cross-section at a paper tray employed in an electrophotographic apparatus or the like, in which said covering is formed in sheet-like fashion, and in which the ends of said covering are made to catch on hooks of the rotating support member which are molded products to prevent dislocation of said covering. (a) being a sectional view, (b) being a side view, (c) being a front view, and (d) being a front view of the support member, (e) being a plan view of the covering, and (f) being a plan view of a covering having attachment holes produced by means of punching.

FIG. 18 Sectional views of rollers on which the coverings at Example 1 through Example 6 in accordance with the present invention have been installed.

FIG. 19 Roller for air cooling or air suction in accordance with the present invention, (a) being a sectional view, (b) being a side view, (c) being a partial front view, and (d) being a partial front view of the support member.

FIG. 20 Drawing showing locations at which various rollers are used in a printing apparatus.

FIG. 21 Roller conveyor employing rollers in accordance with the present invention, (a) being a plan view, and (b) being a front view.

FIG. 22 Drawing showing in schematic fashion a suction roller apparatus comprising a suction roller.

FIG. 23 Shows exemplary constitution of apparatus in which cut-sheet media is conveyed by air suction, (a) being a suction roller that subjects cut-sheet media to suction, and (b) being a suction roller and suction apparatus.

FIG. 24 Graph showing theoretical calculations for the relationship between tensile strength woven and fabric yarn filament diameter.

FIG. 25 Graph showing theoretical calculations for the relationship between tensile strength and number of yarns in the axial direction for several woven fabric yarn filament diameters.

FIG. 26 Graph showing relationship between slippage torque load and tensile force at a rotating support member comprising an aluminum roller covered with a covering comprising cylindrical woven fabric from Working Example 3.

FIG. 27 Schematic diagram showing test method for measurement of torque for occurrence of slippage between an aluminum roller and a covering comprising woven fabric.

FIG. 28 Graph showing relationship between dislocation load at which derailment from grooves occurs and woven fabric step size.

FIG. 29 Schematic view showing test apparatus employed in method for testing effect of step.

FIG. 30 Drawing showing exemplary operations that may be carried out when fabricating a roller in which a rotating support member is covered with a covering in cylindrical weave using heat-shrink weft yarn.

EMBODIMENTS FOR CARRYING OUT THE INVENTION

Below, embodiments of the present invention are described with reference to tables and drawings. Roller 1 of the present invention is a roller 1 that has provided at the surface thereof a covering 3 comprising woven fabric 2, covering 3 being woven fabric 2 constituted from at least two patterns or stripes 4 in a pattern of bands, this woven fabric 2 comprising one basic pattern which is a non-gap-forming portion 7 constituted from two more or less linear rectangular patterns 6, and another basic pattern which is a gap-forming portion 9 at which yarns 5 form gaps 8 after the fashion of a lattice, non-gap-forming portion 7 being such that yarns therein mutually approach or come in contact so that gaps are not formed between yarns.

Moreover, as shown in FIGS. 1 through 4, the basic constitution of a roller 1 in accordance with the present invention is such that it is made up of woven fabric 2 which constitutes covering 3 and rotating support member 10 which supports this woven fabric 2; pattern angle 11, step 12 between respective patterns, pattern width 13 and pitch 14, opening ratio of gaps 15, and the coefficient of friction at the surface of and the coefficient of friction at the back of covering 3 being set as required depending on the function for which roller 1 is being employed.

FIGS. 1 through 4 show an exemplary basic constitution of a roller 1 in accordance with the present invention. FIG. 1 is an exemplary roller 1 covered with covering 3 made to have stripes 4 in a pattern of bands at which cylindrical woven fabric 2a comprising a pattern of lateral bands 16 wherein weave pattern is varied or different weave patterns are used to produce cylindrical weave 23a. Forming a pattern of lateral bands 16 on the surface of roller 1 in this way makes it possible to easily adopt roller 1 for use as a pickup roller 1 or as a supply roller 1 capable of uniform conveyance in the long direction 17 thereof or the like. Alternatively, although not shown in the drawings, if roller 1 is formed so as to be constituted not to have projections at the surface thereof, it will be possible to adopt roller 1 for use as a roller 1 for sheet-like conveyance, a drive roller 1, or an idler roller 1. Furthermore, if air holes 10f shown at (b) in FIG. 4 are provided at rotating support member 10 which supports woven fabric 2 of this covering 3, it will be possible to adopt this for use as a suction roller and/or cooling roller.

FIG. 2 is an exemplary roller 1 covered with covering 3 made to have stripes 4 in a pattern of bands at which woven fabric 2 is made to constitute a pattern of longitudinal bands 21 due to cylindrical weave 23a as a result of the fact that weave pattern is varied or different weave patterns are used. Forming a pattern of longitudinal bands 21 on the surface of roller 1 in this manner causes the thickness 22 of non-gap-forming portion 7 to be uniform, and causes the thickness 22 of gap-forming portion 9 to be uniform, in the direction of rotation 19. By moreover providing steps 12 at the surface, a constitution is attained which permits reduction in lateral displacement of an object when conveying the object, and which can be adopted for use as a roller 1 in an apparatus for which reduction in lateral displacement is desired. Furthermore, by constituting it in this fashion, it will be possible to adopt it for use as a roller 1 in a roller conveyor or the like. Moreover, as was the case at the foregoing FIG. 1, although not shown in FIG. 2, if air holes 10f shown at (b) in FIG. 4 are provided at roller 1 which supports woven fabric 2 of this covering 3, it will be possible to adopt this for use as a suction roller and/or cooling roller.

FIG. 3 is an exemplary roller 1 wherein covering 3 made to have stripes 4 in a pattern of bands comprising woven fabric 2 at which weave pattern is varied or different weave patterns are used to constitute a pattern of lateral bands 16 in the form of cylindrical weave 23a is provided over rotating support member 10, woven fabric 2 which comprises this cylindrical weave 23a being twisted in the direction of rotation 19 so as to constitute a pattern of helical bands. Causing the pattern of lateral bands 16 comprising woven fabric 2 to form a pattern of helical bands on the surface of roller 1 in this way permits a roller 1 to be attained in which force is applied in the direction of rotation 19 and force is applied in the axial direction 20, making it possible for this to be adopted for use as a flat surface cleaning roller, or as a cleaning roller or the like in an apparatus that employs powder or the like.

FIG. 4 shows an exemplary roller 1 at which a covering 3 is formed having stripes 4 in two different patterns of bands comprising woven fabric 2 at which at cylindrical weave 23a, due to the fact that weave pattern is varied or different weave patterns are used, approximately one-half is a lattice-like pattern 24 having gaps 15 and approximately one-half is a region at which yarns mutually approach or come in contact, being a pattern without gaps 15 and having a portion of width 13a which is a non-gap-forming portion, this woven fabric 2 in which air holes 10f are present being provided on rotating support member 10, a location on woven fabric 2 at which gap-forming portion 9, i.e., lattice-like pattern 24, is formed being an air-permeable portion having a portion of width 13b which is a gap-forming portion capable of suction and/or cooling. By rotating this roller 1, it is possible to easily provide a roller 1 which permits suction and/or cooling to easily be switched on and off. Furthermore, by employing yarn which includes fibers having high coefficient of friction at non-gap-forming portion 7, and by employing yarn having low coefficient of friction at gap-forming portion 9, it is possible to make this capable of intermittent feed such as might occur when a conveyed object is fed for one half-rotation and is stopped for one half-rotation, or the like.

FIG. 5 shows an exemplary constitution at which varying of plain weave 27 weave pattern serves as means for forming non-gap-forming portion 7 and gap-forming portion 9 at woven fabric 2 provided at the surface of roller 1, (a) being a surface view and (b) being a side view. As indicated at the exemplary constitution in which weave pattern is varied at FIG. 5, the means for forming non-gap-forming portion 7 and gap-forming portion 9 is that whereas weft yarns 25 have prescribed yarn pitch 14, which is to say that weft yarns 25 are arranged at weft yarn pitch 14a; interlaced with these weft yarns 25 there are small-diameter warp yarns 26a serving as warp yarns 26 that form gaps 15 therebetween, to form gap-forming portion 9 comprising gap regions 9a constituted so as to have these gaps 15; and also interlaced with these weft yarns 25 there are large-diameter warp yarns 26b serving as warp yarns 26 in a constitution in which there are no gaps therebetween, forming non-gap-forming portion 7 comprising gapless regions 7a, the plain weave 27 weave pattern being such that there is this gap-forming portion 9 and this non-gap-forming portion 7. That is, small-diameter warp yarn 26a at prescribed pitch 14b in gap-forming portion 9 constitutes gap-forming portion 9 in plain weave 27, forming gaps 8 after the fashion of a lattice formed such that there is pitch 14a between weft yarns and pitch 14b between respective small-diameter warp yarns 26a therein, this region serving as gap region 9a. Gapless region 7a and gap region 9a are thus formed by varying the weave pattern at woven fabric 2, gapless region 7a being made to serve as non-gap-forming portion 7, and this being an exemplary constitution in which plain weave 27 weave pattern is varied and which comprises a gap-forming portion 9 in which the size of the gaps 15 thereof can be varied by varying the pitch 14a between weft yarns and the pitch 14b between small-diameter warp yarns 26a in this gap region 9a. This is also an exemplary diagram of a situation in which thickness of small-diameter warp yarn 26a is different from that of large-diameter warp yarn 26b, being an example of a situation in which distance $H_2$ between large-diameter warp yarns 26b at the respective front and back of non-gap-forming portion 7 is different from distance $H_1$ between small-diameter warp yarns 26a at the respective front and back of gap-forming portion 9, and in which thickness 22 of non-gap-forming portion 7 and thickness 22 of gap-forming portion 9 are different, variation in the plain weave 27 weave pattern causing presence of recesses and projections at the front and back thereof. Note that pitch 14c between adjacent large-diameter warp yarns 26a at the respective front and back of non-gap-forming portion 7 is shown at (b) in FIG. 5.

FIG. 6 shows an exemplary constitution at which combination of weave patterns is employed for formation of non-gap-forming portion 7 and gap-forming portion 9 at woven fabric 2 provided at the surface of roller 1, (a) being a surface view and (b) being a side view. As indicated at the exemplary constitution in which combination of weave patterns is employed at FIG. 6, the means for forming non-gap-forming portion 7 and gap-forming portion 9 is that weft yarns 25 have prescribed pitch 14, which is to say that weft yarns 25 are arranged at weft yarn pitch 14a, and in a satin weave 28 weave pattern in which distance between weft yarns 25 that are weft yarns 25 which intersect with warp yarns 26 is greater than would be the case for a plain weave 27 weave pattern, large-diameter warp yarns 26b are woven in a constitution such that they mutually approach or come in contact, this being a region in which gaps tend not to form, to produce non-gap-forming portion 7 comprising gapless regions 7a. In contradistinction hereto, at gap-forming portion 9, small-diameter warp yarns 26a together with weft yarns 25 at prescribed weft yarn pitch 14a constitute plain weave 27 or twill weave 29 in similar fashion as weft yarns 25, forming gaps 8 after the fashion of a lattice formed at pitch 14b between small-diameter warp yarns 26a and weft yarns 25 therein, this region serving as gap region 9a. By thus employing combination of weave patterns at woven fabric 2 for formation of gapless region 7a and gap region 9a, gapless region 7a is made to serve as non-gap-forming portion 7, and because gap region 9a is such that the size of the gaps 15 therein can be varied by varying pitch 14a between weft yarns and the pitch 14b between small-diameter warp yarns 26a, this is an exemplary constitution in which there is combination of weave patterns serving as gap-forming portion 9, and being an example of a situation in which the magnitudes of distance $H_1$ between small-diameter warp yarns 26a and distance $H_2$ between large-diameter warp yarns 26b are different, and in which the thickness 22 of non-gap-forming portion 7 and the thickness 22 of gap-forming portion 9 are different, this is also an exemplary constitution in which combination of satin weave 28 and plain weave 27 weave patterns causes formation of recesses and projections at the front side thereof.

FIG. 7 shows an exemplary constitution at which combination of weave patterns is employed for formation of non-gap-forming portion 7 and gap-forming portion 9 constituted as a result of variation in plain weave 27 weave pattern, (a) being a surface view and (b) being a side view. In the context of woven fabric 2 in an exemplary constitution in which there is combination of weave patterns for formation of non-gap-forming portion 7 and gap-forming portion 9, this is an exemplary constitution in which soft-twist multifilament 30 is used at small-diameter warp yarn 26a which forms gaps 15, the plurality of fibers which form small-diameter warp yarn 26a spreading out and assuming a flattened state where small-diameter warp yarns 26a comprising multifilament yarn 30a are over weft yarns 25 comprising monofilament 31, use of multifilament 30 at warp yarn 26a causing decrease in the size of gaps 15, and being an example of a situation in which the magnitudes of distance $H_2$ between large-diameter warp yarns 26b and distance $H_1$ between small-diameter warp yarns 26a are different, and in which the thickness 22 of non-gap-forming portion 7 and the thickness 22 of gap-forming portion 9 are different, this is also an exemplary constitution in which plain weave 27 weave pattern is employed for formation of recesses and projections at the front and back thereof.

Furthermore, FIG. 8 shows an exemplary constitution at which combination of weave patterns is employed for formation of non-gap-forming portion 7 and gap-forming portion 9 constituted as a result of variation in plain weave 27 weave pattern, (a) being a surface view and (b) being a side view. In the context of woven fabric 2 in which non-gap-forming portion 7 and gap-forming portion 9 are formed, this is an exemplary constitution in which soft-twist multifilament 30 is used at weft yarn 25 which forms gaps 15, the plurality of fibers which form weft yarn 25 spreading out and assuming a flattened state where weft yarns 25 comprising multifilament yarn 30a are over warp yarns 26a comprising monofilament 31, use of multifilament 30 at weft yarn 25 causing narrowing of gaps 15, and being an example of a situation in which the magnitudes of distance $H_1$ between respective small-diameter warp yarns 26a and distance $H_2$ between respective large-diameter warp yarns 26b are different, and in which the thickness 22 of non-gap-forming portion 7 and the thickness 22 of gap-forming portion 9 are different, and also being an example of a situation in which gaps 15 are formed so as to have narrow width in the lateral direction as a result of the fact that pitch between a small-diameter warp yarns 26a and the adjacent small-diameter warp yarn 26a is 14b, this is also an exemplary constitution in which plain weave 27 weave pattern is employed for formation of recesses and projections at the front and back thereof.

FIG. 9 shows an exemplary constitution at which combination of weave patterns is employed for formation of non-gap-forming portion 7 and gap-forming portion 9 constituted from combination of satin weave 28 and plain weave 27 weave patterns, (a) being a surface view and (b) being a side view. At woven fabric 2 in which non-gap-forming portion 7 and gap-forming portion 9 are formed, an example is indicated in which small-diameter warp yarn 26a and large-diameter warp yarn 26b both employ multifilament yarn 30 comprising a plurality of fibers, pitch 14b between small-diameter warp yarns 26a being formed so as to be a distance which is such that small-diameter warp yarns 26a on the same surface thereof do not mutually come in contact. Accordingly, this small-diameter warp yarn 26a, being soft-twist multifilament yarn 30, the multifilament yarn 30 at small-diameter warp yarn 26a, as it not controlled by the adjacent small-diameter warp yarn 26a, is such that the fibers, i.e., filaments, are made to spread out and assume a flattened state over weft yarn 25, so that filament gaps are made to assume a small state. In addition, this is an exemplary constitution in which, because large-diameter warp yarns 26b at the same surface mutually approach or come in contact, they tend not to assume a flattened state such as is the case with small-diameter warp yarns 26a; and furthermore, because this region is woven in satin weave 28, steps 12 tend to form on the surface on the side at which large-diameter warp yarns 26b in satin weave 28 are more exposed, while on the surface at the backside therefrom, as compared with the situation at the surface on which large-diameter warp yarns 26b are more exposed, there is less control due to adjacent yarns, and so they tend to assume a flattened state, such that steps 12 due to non-gap-forming portion 7 and gap-forming portion 9 are formed on the side at which warp yarns 26 are more exposed, the state at the surface on the back side being such that steps are almost completely absent there. Also, the magnitudes of distance $H_1$ between respective small-diameter warp yarns 26a comprising multifilament 30 and small-diameter warp yarns 26a comprising multifilament 30 and distance $H_2$ between large-diameter warp yarns 26b comprising multifilament 30 are different, such that distance $H_1$ distance ≤ distance $H_2$. That is, this is an example of a situation in which the thickness 22 of non-gap-forming portion 7 and the thickness 22 of gap-forming portion 9 are different, combination of the satin weave 28 weave pattern and the plain weave 27 weave pattern causing formation of recesses and projections at the front side thereof.

As indicated above, FIG. 5 and FIG. 6 indicate means for constituting non-gap-forming portion 7 and gap-forming portion 9 through variation of weave pattern or combination of weave patterns; FIG. 7 and FIG. 8 indicate exemplary constitutions in which yarn 5 causes gaps 15 at gap-forming portion 9 to become small; and FIG. 9 indicates an exemplary constitution of a means for forming steps 12 at one side. In this way, it is possible to form a wide variety of non-gap-forming portions 7 and gap-forming portions 9 through variation of weave pattern or combination of weave patterns at woven fabric 2 which serves as covering 3.

Furthermore, as means for imparting a required coefficient of friction to the surface of roller 1, where a low coefficient of friction is required at roller 1, a roller 1 having a low coefficient of friction may be fabricated through means causing reduction in area over which contact is made with an object subject to conveyance or with an opposing roller 1, and/or means employing yarn 5 having low coefficient of friction at yarn 5 in woven fabric 2 serving as covering 3. For example, at woven fabric 2 shown in FIG. 12, where there is combination of satin weave 28 and plain weave 27 weave patterns, the surface of roller 1 may be made to have low coefficient of friction through means in which contact area is reduced as a result of formation of non-gap-forming portion 7 comprising steps 12 as a result of causing core yarn 32 serving as warp yarn 26 comprising monofilament 31 which is thicker than other yarn 5 to be employed as the yarn 5 of weft yarn 25 which is more exposed at linear portions as a result of being in satin weave 28, or through means in which fluorinated fibers comprising fluorocarbon resin of low coefficient of friction are employed at, of the yarns 5 which form non-gap-forming portion 7 and the gap-forming portion 9, at least the yarns 5 which mutually approach or the yarns 5 which mutually come in contact at non-gap-forming portion 7.

Conversely, where a high coefficient of friction is required at the surface of roller 1, by employing yarn 5 in which a material such as polyurethane fiber(s) which are elastic fiber(s) having high coefficient of friction are twisted together at core yarn 32 or employing yarn 5 in which core yarn 32 is covered with a material such as polyurethane fiber(s) which are elastic fiber(s) having high coefficient of friction, or by employing a material such as polyurethane fiber(s) having high coefficient of friction and comprising elastic fiber(s) at the yarn 5 from which at least non-gap-forming portion 7 is formed, it will be possible to cause roller 1 to be such that the surface of rotating support member 10 has high coefficient of friction. Furthermore, where projections are not required at the surface, by employing the same yarn 5 as the yarn 5 used at woven fabric 2, it will be possible to form a surface without recesses and projections. Furthermore, with respect to recesses and projections at one surface, as mentioned above at the description with reference to FIG. 9, employment of multifilament yarn 30a at large-diameter warp yarn 26b in regions made in satin weave 28 which are non-gap-forming portions 7 and also at warp yarn 26a at gap-forming portions 9 made in plain weave 27 will make it possible to cause recesses and projections to be formed on one side in marked fashion, and by making this the back side, it will be possible to form roller 1 in such fashion that recesses and projections on the surface thereof are small.

Roller 1 in accordance with the present invention thus comprises a constitution that did not exist conventionally, being a roller 1 covered with covering 3 comprising woven fabric 2 capable of accommodating a wide variety of rollers 1. Depending on the function for which roller 1 is to be employed, it will be possible to fabricate a wide variety of rollers 1 which will serve as rotating bodies as required, such as a roller 1 at which many gaps 15 are required or a roller 1 at which no gaps 15 are required, a roller 1 at which steps 12 are required or a roller 1 at which no steps 12 are required, a roller 1 at which it is required that the coefficient of friction be such as to allow a gripping force to be obtained or a roller 1 at which a low coefficient of friction is required or a roller 1 that reduces lateral slippage, and so forth. Such rollers 1 may be employed in apparatuses as appropriate in accordance with properties required for apparatuses, employment of such rollers 1 permitting apparatuses that did not exist conventionally to be provided. Note that woven fabric 2 constituted in this way may be constituted in sheet-like weave 23b or cylindrically shaped cylindrical weave 23a from striped weave 23, and may be used to cover rotating support member 10 which rotates to constitute roller 1.

Next, describing yarn 5 used at woven fabric 2, where woven fabric 2 serving as covering 3 is cylindrical weave 23a comprising striped weave 23, in the context of a covering 3 which is cylindrical weave 23a comprising striped weave 23 formed such that non-gap-forming portion(s) 7 and gap-forming portion(s) 9 are present in alternating fashion in direction of rotation 19, if the covering is to be imparted with stretchability in the radial direction thereof, it is preferred that yarn 5 which is monofilament yarn 31a or multifilament yarn 30a comprising elastic fiber(s) having stretchability and/or yarn 5 which is covered yarn in which the core yarn 32 that is covered comprises elastic fiber(s) be employed at yarn 5 of weft yarn 25 extending in direction of rotation 19. Furthermore, where this is to be made to contract in heat-shrink fashion, it is preferred that yarn 5 which is heat-shrink yarn and/or yarn 5 which is twisted yarn in which low-melting-point fiber(s) are twisted together with heat-shrink yarn be employed at yarn 5 of weft yarn 25 extending in direction of rotation 19. In addition, when gaps 15 are to be formed in this woven fabric 2 which is cylindrical weave 23a comprising striped weave 23, it is preferred that yarn 5 which is monofilament yarn 31a or monofilament 31 to which filament(s) comprising fiber(s) that impart functionality thereto have been added, or yarn 5 which is multifilament yarn 30a in which the fibers have been hard-twisted or fused together, and which is yarn 5 constituted such that the yarn tends not to become flattened or is other such yarn 5 which tends not to spread out laterally, be employed at weft yarn 25 and at small-diameter warp yarn 26a. Furthermore, it is preferred at small-diameter warp yarn 26a that yarn 5 which comprises nonelastic fiber(s) and is not easily stretched be employed to control shrinkage in axial direction 20; and where gaps 15 are to be formed, it is preferred that yarn 5 which is nonstretchable monofilament yarn 31a or monofilament 31 to which fiber(s) that impart functionality thereto have been added, or yarn 5 in which the fibers of multifilament yarn 30 have been fused together and which is yarn 5 constituted so as not to become flattened or is other such yarn 5 which does not spread out laterally, be employed. Where gaps 15 are to be minimized, it is preferred that yarn 5 which comprises soft-twist multifilament yarn 30a or other such yarn in which spreading of fiber(s) tends to occur be employed. It is large-diameter warp yarns 26b, the mutual approach or coming in contact of the yarns 5 of which constitutes gapless region 7a, this region being a region that determines the properties at the surface of roller 1. Where a roller 1 for which a low coefficient of friction is required at the surface of the roller 1, it is preferred that a yarn 5 comprising fluorinated fiber(s) which is a material having low coefficient of friction or the like be employed; or where it is required that the coefficient of friction at the surface be a coefficient of friction similar to that of a roller 1 made of rubber or the like, it is preferred that a yarn 5 in which a material such as polyurethane fiber(s) which are elastic fiber(s) having high coefficient of friction or the like be employed, or that a yarn 5 which includes a material such as polyurethane fiber(s) which are elastic fiber(s) having high coefficient of friction be employed and that the elastic fiber(s) be exposed at the surface.

Moreover, covered yarn in which core yarn 32 of unmodified cross-section which is monofilament 31 is covered with elastic fiber(s), twisted yarn in which yarn having properties different from those of core yarn 32 is twisted thereabout, monofilament yarn 31a which is monofilament 31 of modified cross-section, yarn 5 which is multifilament 30 wherein filament(s) are of modified cross-section, or the like may be employed as yarn 5. Presence of modified cross-section permits increase in area over which contact is made with a conveyed object, permitting attainment of increased effectiveness when gripping characteristics are required at the surface. In this way, use of woven fabric 2 in which filament having coefficient of friction and/or melting point different from that or those of core yarn 32 is employed at monofilament 31 of core yarn 32 comprising artificial fiber makes it possible obtain gripping characteristics, heat resistance, wear resistance, and/or other such properties as may be required. Note that examples of artificial fibers include polyester fiber, polyamide (trade name Nylon) fiber, acrylic fiber, polypropylene fiber, polyethylene fiber, urethane fiber, fluorinated fiber, metal fiber, carbon fibers, glass fiber, rayon fiber, and so forth, there being a great many varieties from which it is possible to select as appropriate depending on application. Furthermore, as low-melting-point fiber, there are low-melting-point polyamide fibers, low-melting-point polyester fibers, low-melting-point polypropylene fibers, and so forth; as heat-shrinkable fiber, there are fibers of the polyvinyl chloride type, polyolefin type, polyamide type (Nylon fibers), polyester type, acrylic type, cellulose type, and so forth, it being possible to select from among these as appropriate.

Furthermore, false-twist yarn and/or covered yarn 5 may be employed to make it possible, where properties different from those of core yarn 32 are required, for same properties to be imparted at front and/or back. Furthermore, yarn including thermally fusible filament having melting point different from core yarn 32 may be employed and heat-setting may be carried out to make it possible to better prevent filament fraying or the like.

When woven fabric 2 comprising sheet-like weave 23b in accordance with the present constitution is to be employed as covering 3, covering 3 may be constituted as a result of employment of yarn 5 which, other than the fact that yarn 5 which contracts in heat-shrink fashion is not employed, is the same as that employed at cylindrical weave 23a comprising striped weave 23.

FIG. 10 is an example of use of yarn 5 and an example of combination of weave patterns, being an example of a covering 3 which is cylindrical weave 23a comprising striped weave 23 constituted such that gap-forming portion(s) 9 and non-gap-forming portion(s) 7 are made to be present in alternating fashion in direction of rotation 19, and which is an example of use of yarn 5 in a situation where stretchability is to be attained in the radial direction, and which is moreover an example in which there is combination of weave patterns, non-gap-forming portion(s) 7 being constituted by satin weave 28 and gap-forming portion(s) 9 being constituted by plain weave 27, and there is also constitution of step(s) 12. Note that non-gap-forming portion 7 is formed in a rectangular pattern 6. To cause roller 1 to be imparted with properties such that it has stretchability in the radial direction, as shown in the side view at (a) in FIG. 10, an example is indicated in which yarn 5 comprising elastic fiber is employed at weft yarn 25, and to obtain stretching force, yarn 5 provided with elastic fiber comprising monofilament 31 is used at core yarn 32 or covered yarn 5 covered with filament 31b as covering over the exterior of the elastic fiber of core yarn 32 is used; and in addition, nonstretchable multifilament yarn 30a or nonstretchable monofilament yarn 31a comprising nonelastic fiber is used at small-diameter warp yarn 26a extending in axial direction 20 at gap-forming portion 9 to achieve a constitution in which there will be little tendency for stretching to occur in axial direction 20, and yarn 5 comprising elastic fiber for improving force of friction between it and rotating support member 10 is employed at large-diameter warp yarn 26b at non-gap-forming portion 7. Furthermore, this is also an example of a situation in which the yarn 5 comprising the elastic fiber of large-diameter warp yarn 26b is constituted so as to be thicker than the monofilament yarn 31a of small-diameter warp yarn 26a, and in which steps 12 are formed. Furthermore, by causing yarn 5 to include elastic fiber, and by using low-melting-point elastic fiber as elastic fiber, the constitution may be made such that adjacent large-diameter warp yarns 26b at portion(s) in satin weave 28 are made to fuse together by the heat from heat-setting, so that notwithstanding any stretching of weft yarns 25 which may occur, stretching in the direction of rotation 19 will be controlled due to fusion at portion(s) in satin weave 28, making it less susceptible to the influence of stretching of weft yarn 25, in a constitution in which it is easy to achieve high tension due only to stretching of weft yarns 25 as determined by the pitch between small-diameter warp yarns 26a that form gaps 15.

FIG. 11 shows an example of use of another yarn 5 and an example of combination of weave patterns, being an example of a covering 3 which is cylindrical weave 23a comprising striped weave 23 constituted such that gap-forming portion(s) 9 and non-gap-forming portion(s) 7 are made to be present in alternating fashion in direction of rotation 19, and which is an example of use of yarn 5 in a situation where heat-shrinkability is to be attained in the radial direction, and which is moreover an example in which there is combination of weave patterns, non-gap-forming portion(s) 7 being in satin weave 28 and gap-forming portion(s) 9 being constituted by plain weave 27, and there is also constitution of step(s) 12. Note that here as well, non-gap-forming portion 7 is formed in a rectangular pattern 6. To cause roller 1 to be imparted with properties such that it has heat-shrink characteristics in the radial direction thereof, as shown in the side view at (a) in FIG. 11, yarn comprising heat-shrinkable fiber is employed at weft yarn 25, covered yarn 5 being used which employs heat-shrinkable monofilament 31 as core yarn 32, the exterior of which is covered with thermally fusible filament serving as covering, application of heat causing weft yarn 25 and warp yarn 26 to come into good intimate contact, preventing fraying. Furthermore, examples are indicated in which, at small-diameter warp yarn 26a extending in the axial direction 20 and shown at (b) in FIG. 1, (b) in FIG. 3, and (b) in FIG. 4, i.e., small-diameter warp yarn 26a at gap-forming portion 9 in FIG. 10, nonstretchable multifilament yarn 30a or monofilament yarn 31a comprising nonelastic fiber is used to achieve a constitution in which there is little tendency for stretching to occur in axial direction 20; and at large-diameter warp yarn 26b in non-gap-forming portion 7, yarn 5 comprising elastic fiber having high coefficient of friction is employed to improve the force of friction between it and rotating support member 10 and to achieve high coefficient of friction between it and a conveyed object. Moreover, this is also an example of a situation in which the yarn 5 comprising the elastic fiber of large-diameter warp yarn 26b is constituted so as to be thicker than the monofilament yarn 31a of small-diameter warp yarn 26a, and in which steps 12 are formed. Furthermore, it is also a constitution in which weaving may be carried out in such fashion that thermally fusible yarn is combined with weft yarn 25 or warp yarn 26.

FIG. 12 shows exemplary use of yarn 5 and combination of weave patterns, and shows in schematic fashion a partial enlarged view of striped weave 23 which is constituted in the pattern of longitudinal bands 21 shown at (b) in FIG. 2 by gap-forming portion(s) 9 and non-gap-forming portion(s) 7. Exemplary use of yarn 5 which is constituted so as to allow attainment of stretchability in the radial direction of roller 1 at covering 3 comprising cylindrical weave 23a which is striped weave 23 shown at (b) in this FIG. 2, and an example of woven fabric 2 in which gap-forming portion 9 and non-gap-forming portion 7 are formed by combination of weave patterns, are shown. Note that here as well, non-gap-forming portion 7 is formed in a rectangular pattern 6. To cause roller 1 to be imparted with stretchability in the radial direction thereof, at yarn 5 extending in the direction of rotation 19 shown at (b) in FIG. 2, elastic fiber is employed as yarn 5 which is employed at non-gap-forming portion 7 and at gap-forming portion 9 as shown in FIG. 12; and in the axial direction 20 at (b) in FIG. 2, yarn 5 comprising nonelastic fiber is employed, the yarn 5 used thereat being such as will control stretching in the axial direction 20. Adoption of such a constitution will make it is possible achieve a constitution in which there is stretching in the direction of rotation 19 of roller 1; and by, where this may be required, employing elastic fiber having high coefficient of friction as elastic fiber, it will be possible to achieve a high coefficient of friction between it and a conveyed object. Furthermore, employment of heat-shrink yarn at the yarn which extends in the direction of rotation 19 will make it possible to cause this to undergo heat-shrinkage.

Woven fabric 2 constituted in this way may be formed into cylindrical or sheet-like shape and placed as covering over the surface of rotating support member 10 in a constitution permitting employment as a roller 1.

As described above, covering 3 of woven fabric 2 is such that, with respect to means for providing woven fabric 2 serving as covering 3 with step(s) 12 and means for imparting capabilities thereto such as coefficient of friction and so forth, the constitution is such as to permit control by means of yarn(s) 5, and in addition, by changing the material(s) employed at yarn(s) 5, it is possible to fabricate a wide variety of rollers 1 that have been imparted with heat resistance, weather resistance, and so forth. Note that depending on the application for which it will be employed, insulating fiber and/or electrically conductive fiber may be selected as appropriate for use at yarn 5 in woven fabric 2 serving as covering 3.

Moreover, results of theoretical calculations for tensile strength using Nylon fibers in yarn 5 at woven fabric 2 are shown in FIG. 24 and FIG. 25. FIG. 24 shows relationship between yarn diameter, i.e., filament diameter, and tensile strength; in the example shown at FIG. 24, assuming a yarn density of 20 yarns/cm (yarn pitch=0.5 mm) for yarn formed from Nylon filament in the axial direction of woven fabric 2, a yarn diameter, i.e., filament diameter, of 50μ or more will be required to achieve a tensile strength of 25 N/cm or more. On the other hand, FIG. 25 shows relationship between number of yarns in the axial direction and tensile strength; in the example shown at FIG. 25, with monofilament 31 of diameter 99.6μ or more, it is clear that when the number of yarns, i.e., yarn density (yarns/cm), in axial direction 20 of filament constituting yarn 5 extending in the direction of rotation 19 is approximately 20 yarns/cm or more, tensile strength will be 100 N/cm or more, which is satisfactory in terms of strength. At the respective curves shown in FIG. 25, note that yarn material is monofilament Nylon, diameters of the respective yarns being, in order starting with the lowest curve, 24.9μ, 49.8μ, 99.6μ, 145.5μ, and 198.3μ.

Next, as means for preventing fraying of yarn 5 at woven fabric 2 which covers the surface of rotating support member 10, this may be means comprising a constitution to prevent fraying of end(s) of woven fabric 2 or fraying of yarn 5 which might for example be at least one means selected from among means in which yarn 5 of at least one of weft yarn 25, small-diameter warp yarn 26a, and large-diameter warp yarn 26b which make up woven fabric 2 is made to include low-melting-point filament, low-melting-point elastic fiber, or the like, and in which thermal fusing is employed to cause weft yarn 25 and warp yarn 26 to fuse and prevent fraying of yarn 5; means for preventing fraying of yarn 5 as a result of causing the backside of, which is the reverse side from, the surface of rotating support member 10 to be coated with a viscoelastic or thermoplastic coating agent; adhesive means in which adhesive is used between covering 3 and rotating support member 10; means making use of thermoplastic deformation; means in the form of a machined part or the like comprising a mechanical member; and so forth.

Furthermore, as examples of means for preventing fraying from end(s), FIG. 13 and FIG. 14 show examples of constitutions which carry out prevention of fraying through thermal action and mechanical action. FIG. 13 shows an example, at heat-shrinkable cylindrical woven fabric 2a which employs heat-shrink yarn 5 at weft yarn 25, for preventing fraying of end 2b where it abuts end 10a of rotating support member 10. At (a) in FIG. 13, the constitution is such that the inside diameter $D_2$ of heat-shrinkable cylindrical woven fabric 2a is larger than outside diameter $D_1$ of rotating support member 10, so that $D_1 < D_2$. (b) at FIG. 13 shows an example in which, in the axial direction 20 of rotating support member 10, coverage of rotating support member 10 by cylindrical woven fabric 2a comprising heat-shrinkable cylindrical weave 23a also extends to the portions protruding at left and right beyond the portions at outside diameter $D_1$ of rotating support member 10, these also being covered by heat-shrinkable cylindrical woven fabric 2a; and as shown at (d) in FIG. 13, heat is applied from the surface, causing the heat-shrinkable cylindrical woven fabric 2a to contract and causing woven fabric 2 to come into intimate contact with the surface of rotating support member 10, simultaneous with which the portions protruding at left and right from the surface of rotating support member 10 undergo plastic deformation and contract due to the heat, and by causing this to assume the shape shown at (c) and (d) in FIG. 13, it is possible to carry out prevention of initiation of fraying from end(s) 10a of cylindrical woven fabric 2a.

FIG. 14 shows an example of prevention of fraying at end(s) by means of a stretchable cylindrical woven fabric 2a that employs stretchable yarn 5 at weft yarn 25. The constitution is such that the inside diameter $D_2$ of stretchable cylindrical woven fabric 2a is smaller than outside diameter $D_1$ of rotating support member 10, so that $D_1 > D_2$. This stretchable cylindrical woven fabric 2a is stretched and made to cover rotating support member 10. In this regard, (b) at FIG. 14 shows an example in which, in the axial direction 20, stretchable cylindrical woven fabric 2a is constituted such that cylindrical woven fabric 2a protrudes to the left and right in axial direction 20 beyond outside diameter $D_1$ of rotating support member 10, the protruding portions being pressed on by retainer rings 34 which are mechanical members that are mechanically pressed onto the ends of rotating support member 10, this pressing force preventing fraying of yarn from the ends of cylindrical woven fabric 2a. In addition, (c) and (d) at FIG. 14 show an example in which causing the ends of cylindrical woven fabric 2a at the ends of rotating support member 10 to be pressed on by retainer rings 34 also prevents dislocation such that woven fabric 2 constituting covering 3 is provided with antirotation capability. Prevention of fraying can thus be carried out through use of a variety of means.

Next, describing prevention of dislocation of covering 3 on roller 1 in accordance with the present invention, such dislocation prevention means may be means in which covering 3 antirotation member(s) are installed at end(s) of roller 1 to prevent dislocation of covering 3; dislocation prevention means operating by means of the gripping force produced by the coefficient of friction between covering 3 and rotating support member 10 and the tension due to covering 3; dislocation prevention means operating by means of groove(s) 10b, protrusion(s) 10c, and/or hook(s) 10d operating by means of mechanical structure; dislocation prevention means operating by means of step(s) 12 shaped so as to have recess(es) and projection(s); dislocation prevention means operating by means of adhesion and/or stickiness operating by means of physicochemical action; and/or dislocation prevention means operating by means of the force of tightening which is produced by heat-shrinking of yarn 5 as a result of thermal action or dislocation prevention means operating by means of thermal fusing as a result of thermal action.

As shown in FIG. 10, dislocation prevention means employing gripping force obtained from coefficient of friction and tension may be constituted such that yarn comprising elastic fiber is employed at weft yarn 25 extending in the direction of rotation 19 of covering 3 constituting woven fabric 2 so as to allow tension to be obtained in the direction of rotation. Where covering 3 is cylindrical weave 23a (cylindrical woven fabric 2a), this is constituted to allow tension to be obtained as a result of forming this such that length at the inside circumference of cylindrical weave 23a (cylindrical woven fabric 2a) is shorter than length at the outside circumference of rotating support member 10 at covering 3, and in addition, yarn comprising polyurethane fiber or other such elastic fiber having high coefficient of friction is employed as the yarn 5 used in non-gap-forming portion 7 so as to produce a constitution in which there is a high coefficient of friction at the back of woven fabric 2. Prevention of dislocation of covering 3 is carried out by obtaining gripping force produced by the friction between rotating support member 10 at covering 3 and covering 3 and the tension of covering 3; and by employing filament comprising modified cross-section as the shape of yarn 5 having high coefficient of friction which is used thereat, a constitution is obtained in which there is further increase in the domain over which contact is made with rotating support member 10 and in which prevention of dislocation of covering 3 is made even more possible. By moreover causing the surface of rotating support member 10 to possess protrusions due to fine texturing, woven fabric 2 comprising fiber can be made to dig into the protrusions due to fine texturing at rotating support member 10, as a result of which it will be possible to obtain gripping characteristics at low tension with low force of tightening. As means for providing fine texturing on the surface of rotating support member 10, these may be formed by shot/sand blasting, hairline texturing, and/or other such surface treatment and/or surface machining techniques.

FIG. 15, FIG. 16, and FIG. 17 show examples of the aforementioned dislocation prevention means operating by means of step(s) 12 shaped so as to have recess(es) and projection(s) and dislocation prevention means operating by means of groove(s) 10b, protrusion(s) 10c, and/or hook(s) 10d operating by means of mechanical structure. FIG. 15 shows an example in which rotating support member 10 is provided with grooves 10b, the constitution being such that the portion in satin weave 28 which constitutes non-gap-forming portion 7 in steps 12 constituted as a result of combination of plain weave 27 and satin weave 28 weave patterns at woven fabric 2 enters these grooves 10*b* to produce a constitution in which prevention of dislocation of woven fabric 2 in the direction of rotation 19 is carried out. In addition, it is sufficient that depth of these grooves 10*b* be not less than half the diameter of yarn 5 used thereat, dislocation in the direction of rotation 19 being prevented thereby.

FIG. 16, as shown at (d) therein, shows an example in which region(s) at flange(s) 10*e* of rotating support member 10 is/are provided with protrusion(s) 10*c* to prevent dislocation of woven fabric 2 constituting covering 3. As shown in the front view of rotating support member 10 at (d) in FIG. 16, this is an example in which a region at flange 10*e* at the end of rotating support member 10 is provided with protrusions 10*c* comprising projections. As shown at (c) in FIG. 16, the constitution is such that protrusion 10*c* enters lattice-like gap 8 in woven fabric 2 constituting covering 3. Regarding the height of protrusion 10*c* comprising projection(s), where the position of protrusion 10*c* on roller 1 is to the exterior of the location at which the conveyed object is conveyed, it is sufficient that the height of protrusion 10*c* be a height such as will not cause interference with objects other than woven fabric 2 constituting covering 3. On the other hand, where the position of protrusion 10*c* is toward the central portion of roller 1 at which the conveyed object is conveyed, it is sufficient that the height of the tip of protrusion 10*c* be no larger than the thickness 22 of covering 3, so that the surface of the conveyed object that faces roller 1 is not pressed on and marred by the tip of protrusion 10*c*. Alternatively, if protrusion 10*c* enters lattice-like gap 8 of woven fabric 2 constituting covering 3 and engages therewith so as not to come free therefrom, protrusion(s) 10*c* of height(s) smaller than thickness 22 may be provided at any location(s) on covering 3.

FIG. 17 is an example of a situation in which covering 3 is employed at pickup roller 1*b* having semicircular cross-section at a paper tray employed in an electrophotographic apparatus or the like. Here, this is an example in which woven fabric 2 constituting covering 3 is formed in sheet-like fashion and is made to catch on hooks 10*d* of rotating support member 10 which is a molded product to prevent dislocation of woven fabric 2 constituting covering 3. In the example shown in FIG. 17 at the sectional view at (a) and at the side view at (b), as means for preventing dislocation of woven fabric 2 constituting covering 3, rotating support member 10 which is a molded product is provided with hooks 10*d*, covering 3 which has been cut into sheet form and which has high coefficient of friction at the surface thereof being attached to hooks 10*d* of rotating support member 10 to prevent dislocation. In FIG. 17, at the plan view of covering 3 shown at (e) and the plan view of covering 3 having installation holes at (f) therein, this is an example of a constitution in which hooks 10*d* enter gaps 15 in the mesh portion 27*a* corresponding to locations made in plain weave 27 and are controlled and held in place by satin weave 28 to prevent dislocation. At this example in 17, prevention of fraying can be carried out by subjecting warp yarn 26 and weft yarn 25 to adhesive treatment, coating treatment, and/or thermal fusing treatment. The constitution makes it possible for woven fabric 2 in sheet-like form and treated in such fashion to be employed such that it is attached to hooks 10*d* and such that there will be no dislocation of yarn. Furthermore, where woven fabric 2 which is in sheet-like form and in which prevention of fraying has been carried out at yarn 5 is employed, if attachment gap 15 is too small, a constitution may be adopted in which holes 10*h* are provided therein by means of punching, as shown at (f) in FIG. 17. Where rotating support member 10 comprises synthetic resin, the constitution may be such that hooks 10*d* are held in place as a result of utilization of resin elasticity of rotating support member 10 or are held in place as a result of thermal fusing. Moreover, where nip width is required, the constitution may be such that rubber, a foamed body, or other such material having reactive-force-providing elasticity is provided between rotating support member 10 and this covering 3.

As shown in FIG. 13, as dislocation prevention means operating by means of thermal action, yarn 5 which is heat-shrinkable fiber is employed at weft yarn 25, i.e., yarn 5 extending in the direction of rotation 19, to form covering 3 in the form of cylindrical weave 23, this is used to cover rotating support member 10, and heat is applied thereto to cause it to contract in heat-shrink fashion, causing rotating support member 10 and covering 3 to be brought into intimate contact so as to prevent dislocation; and because causing the surface of rotating support member 10 to be provided with fine texturing will make it possible for protrusions due to the texturing to press against yarn 5 and prevent dislocation, it is more preferred that fine texturing be provided at the surface of rotating support member 10. Furthermore, prior to application of heat, a primer might be applied to rotating support member 10 for further improvement in intimate contact and prevention of dislocation. Moreover, as yarn 5 which is employed at cylindrical weave 23*a*, yarn 5 comprising elastic fiber having high coefficient of friction might be employed at yarn 5 forming non-gap-forming portion 7 at which yarn density is high to improve the force of friction at covering 3 and prevent dislocation. Note that it is more preferred for control of the contraction occurring in the axial direction 20 as a result of contraction that non-heat-shrink yarn 5 be employed at the yarn 5 which extends in the axial direction 20 and which forms gap-forming portion 9, and it is preferred that yarn 5 comprising nonstretchable monofilament yarn 31*a* be employed at least at the yarn 5 which extends in the axial direction 20. Moreover, it is preferred that weft yarn 25 and/or warp yarn 26 be formed so as to include thermally fusible fiber, as a result of which it will be possible to cause fusion of yarns 5 with each other and/or fusion thereof with rotating support member 10, allowing still further prevention of dislocation. As primer used at the surface of rotating support member 10 which may be additionally employed, while these include resin-type primers and rubber-type primers, synthetic-rubber-type primers are preferred because these will allow better prevention of dislocation.

While not shown in the drawings, dislocation prevention means operating by means of adhesion and/or stickiness constituting physicochemical action are such that employment of stretchable or heat-shrink yarn 5 at yarn 5 extending in the direction of rotation 19, and use of rubber-type adhesive and/or general-purpose non-pressure-sensitive adhesive or general-purpose pressure-sensitive adhesive to secure rotating support member 10 and covering 3, will permit prevention of dislocation of covering 3. Furthermore, a constitution may also be adopted in which covering 3 is woven fabric 2 which is made up of artificial fiber, has good permeability with respect to adhesive, the constitution of covering 3 further being such that there is good stretchability or heat-shrinkability in the direction of rotation 19, and such that adhesion only need be carried out in partial fashion.

FIG. 18 is a drawing showing various exemplary sections of rollers 1 in accordance with the present invention, these being listed as Example 1 through Example 6.

The respective rollers 1 will next be described. First, describing feed roller 1b for feeding cut-sheet media which is shown in FIG. 20, if the sheets are paper 37, paper dust and the like will adhere to the surface of rotating support member 10, which can create an increased tendency for misfeeds to occur in accompaniment to the reduction in coefficient of friction. To prevent such misfeeds, a rubber surface had conventionally been employed which was provided with recesses and projections in an attempt to achieve stable feed. On the other hand, in accordance with the present invention, to provide recesses and projections at the surface and stabilize coefficient of friction, as constitution of recesses and projections at woven fabric 2 making up covering 3, the weave patterns shown in FIG. 6 and/or FIG. 9 is used to produce woven fabric 2 which is constituted by combination of weave patterns such that satin weave 28 is used to form non-gap-forming portion 7, and plain weave 27 or twill weave 29 is used to form gap-forming portion 9, recesses and projections being formed by means of a constitution in which there is difference in the flattening of soft-twist multifilament yarn 30a or different thicknesses are employed for the thickness of warp yarn 26 extending in the axial direction 20. In addition, yarn 5 made up of elastic fiber having high coefficient of friction is employed as warp yarn 26 employed at portions of satin weave 28 corresponding to projections which come in contact with sheets, to achieve a constitution in which coefficient of friction is high only at projections which come in contact with sheets. Furthermore, as shown at (b) in FIG. 12, the constitution is such that gap-forming portion 9, being in plain weave 27 or twill weave 29, and being a region in which gaps 15 are formed, is such that paper dust and the like tends to enter the recesses of these gaps 15, resulting in stabilization of coefficient of friction at the surface of the projections.

Describing drive rollers 1a which include registration rollers and belts which must be capable of precision feeding, as the capabilities demanded for these are properties such as precision at the outside diameter, stability of the coefficient of friction at the surface, and lack of tendency for dust and the like to adhere, such properties will be demanded of roller 1. As woven fabrics 2 which fulfill such capabilities, covering 3 comprising cylindrical weave 23a having thickness 22 of high precision may be formed by carrying out weaving in such fashion that weave patterns shown in FIG. 5, FIG. 6, and FIG. 12 are varied or are used in combination; yarn diameter, i.e., thickness, of yarn 5 at small-diameter warp yarn 26a and large-diameter warp yarn 26b are such that yarn 5 of more or less the same thickness is employed thereat; and yarn 5 having stretchable or shrinkable characteristics is employed at weft yarn 25. Furthermore, by using yarn 5 having high coefficient of friction at yarn 5 where yarns 5 mutually approach or come in contact at location(s) where non-gap-forming portion(s) 7 are formed, it will be possible to obtain satisfactory coefficient of friction at the surface. Moreover, regarding contamination at the surface of roller 1, by causing gap-forming portion 9 to be constituted in lattice-like fashion such that there are gaps 15 present therein, steps 12a are formed due to the thicknesses of the yarns between it and rotating support member 10, such that dust and other such contaminant material tend to enter these lattice-like gaps 15, making it possible to minimize the negative effect thereof at the surface of roller 1, and permitting constitution of a roller 1 that is capable of stable conveyance and drive. As yarn 5 in woven fabric 2 for which it is thusly required that thickness 22 of covering 3 be of good precision, yarn 5 in which monofilament yarn 31a or multifilament 30 has been melted together in integral fashion is preferred, and where it is required that additional capabilities be imparted thereto, it is preferred that covered yarn in which monofilament 31 serving as core yarn 32 is covered be employed.

FIG. 19 shows an exemplary air-cooled roller 1 or air-suction roller 1. As shown at (d) in FIG. 19, the interior of rotating support member 10 is hollow, and machining has been carried out to cause air holes 10f to be provided as shown at (a) in FIG. 19, or air holes 10f or gaps 15 have been provided through molding of resin. This is a rotating support member 10 that has moreover been constituted so that the end(s) of roller 1 permit suction of air therethrough, and as shown at (c) in FIG. 19, the constitution is such that covering 3 is provided at the surface of rotating support member 10. In addition, the constitution is such that air is sucked or injected through suction hole 18 or injection hole 18 provided at the side surface(s) of rotating support member 10. Furthermore, rotating support member 10 may be a rotating support member 10 which is produced by extrusion or a rotating support member 10 which is produced by molding, and at the time that such rotating support members 10 are manufactured, slits may be provided at rotating support member 10 at the time of extrusion if it is extruded, or air holes 10f may be provided at rotating support member 10 at the time of molding if it is molded. Furthermore, by constituting this in this fashion so that covering 3 comprising woven fabric 2 is provided at the surface of rotating support member 10, roller 1 will be of a constitution such as will permit elimination of scratches and/or offset defects which would otherwise appear on the sheets or the like that are conveyed thereby.

A situation in which a roller 1 in accordance with the present invention is employed as a cleaning roller will moreover be described. With a combination of weave patterns comprising those at FIG. 9, employing multifilament yarn 30 comprising soft-twist synthetic fiber as warp yarn 26b and warp yarn 26a extending in the axial direction 20, employing shrinkable or stretchable monofilament yarn 31a at weft yarn 25, woven fabric 2 made in cylindrical weave 23a is used to cover the surface of rotating support member 10 to produce a cleaning roller. Large-diameter warp yarn 26b being yarn 5 which is thicker than small-diameter warp yarn 26a, large-diameter warp yarn 26b and weft yarn 25 are employed to weave satin weave 28 and form non-gap-forming portion 7, and small-diameter warp yarn 26a and weft yarn 25 are employed to form gap-forming portion 9, gaps 15 thereof being such that soft-twist small-diameter warp yarn 26a spreads out over weft yarn 25, gaps 15 being constituted so as to be small, and the constitution being such that steps 12 are present. Covering 3 comprising cylindrical weave 23a constituted in this fashion is installed on the surface of rotating support member 10, covering 3 comprising this cylindrical weave 23a being twisted so as to have prescribed twist angle 42 with respect to rotating support member 10 (see FIG. 3), in which state it is secured in place so that this state is maintained, to produce a cleaning roller. In addition, where this cleaning roller is such that elasticity is required at roller 1, the constitution may be such that elasticity is obtained by means of elasticity due to the structure of rotating support member 10, or through provision of an elastic body 33 which is a foamed body, elastomer, or the like at the surface of rotating support member 10. Moreover, where air permeability is required this may be constituted so as to have air permeability, and where air suction capability is required this may be constituted so as to have air suction capability. Note that cleaning action is such that formation of steps 12 causes formation of angle(s) comprising multifilament 30 at large-diameter warp yarn 26b in non-gap-forming portion 7, such angle(s) comprising a filament being made to possess scraping effect, the dust and so forth which is scraped thereby entering recesses constituting gap-forming portion 9, the dust and so forth which is scraped due to rotation and twist angle 42 being made as a result of this angle to move or be sucked in axial direction 20, permitting attainment of a cleaning roller not available conventionally in which clogging of pores and the like does not occur. Regarding the filament that constitutes the scraping angle, it should be noted that the smaller the filament diameter the greater will be the effect, and it is more preferred that filament be employed which is such that filament cross-section has an acute angle. In a constitution in which sheet-like covering 3 may be provided at the surface of rotating support member 10, the present invention is thus constituted such that this is covered with cylindrical covering 3 or sheet-like covering 3 to produce roller 1.

Next, an apparatus employing roller 1 provided with covering 3 comprising woven fabric 2 in accordance with the present invention will be described. FIG. 20 shows a printing apparatus that employs various rollers 1 and locations at the interior of the printing apparatus where the rollers 1 may be used. As shown in FIG. 20, at an electrophotographic apparatus which is an apparatus that employs paper 37, rollers 1 in accordance with the present invention may be employed at various locations which include feed roller 1b, conveyor roller 1c, lead edge alignment roller 1d, belt drive roller 1e, belt idler roller 1f, cooling roller 1h, and so forth. Intermediate transfer belt 36 engages with this belt drive roller 1e and this belt idler roller 1f; moreover, behind this intermediate transfer belt 36, fuser rollers 1g, 1g being present, paper 37 is acted on, as arranged therein is conveyor belt 35 that conveys paper on which transfer has been carried out between belt idler roller 1f and drive roller 1a to fuser rollers 1g, where fusing is carried out.

FIG. 21 shows an example of a situation in which a roller conveyor 1i is employed. As shown in FIG. 21, a pattern of bands comprising non-gap-forming portions 7 and gap-forming portions 9 is formed, inclusion of elastic fiber having high coefficient of friction at the surface permitting formation of a roller 1 that is satisfactory with respect to lateral slippage, this being an exemplary constitution of a roller conveyor 1i which employs this roller 1 and which may be employed to convey a conveyed object or the like.

FIG. 22 is a drawing showing a schematic of a suction roller apparatus that uses roller 1 as a suction roller 1j. As shown in FIG. 22, roller 1 in accordance with the present invention is formed by causing cylindrical rotating support member 10 which has suctions holes at the surface thereof to be covered by covering 3 comprising cylindrical woven fabric 2a. Air is sucked by fan or compressor serving as suction apparatus 38 by way of suction hole 18 provided at rotating shaft 10g at the end of roller 1. Here, air is sucked through suction holes provided at the surface of hollow rotating support member 10 and through the mesh-like spaces of cylindrical woven fabric 2a which covers the outside circumference thereof. Because mesh-like gaps 15 are arranged in uniform fashion with respect to the axial direction 20 of this suction roller 1j, and because these comprise yarn 5 constituting filament made of synthetic fiber, this is a suction roller apparatus having a suction roller 1j which is capable of uniform suction and which, when a sheet-like object is sucked thereagainst, tends not to cause occurrence of scratches and the like at the front or back of the sheet-like object. Furthermore, resistance to airflow of suction roller 1j may be arbitrarily set by varying mesh-like density and filament diameter at cylindrical woven fabric 2a.

Furthermore, FIG. 23 shows exemplary constitution of an apparatus that uses air suction to convey cut-sheet paper 37. (b) at FIG. 23 shows a diagram of the constitution of an apparatus provided with suction fan 38a and low-pressure chamber 38b, and provided within low-pressure chamber 38b there is a solenoid 43 at which the opening and closing of a suction valve is controlled by electrical signal, suction fan 38a causing reduction in the pressure of low-pressure chamber 38b, the switching on and off of solenoid 43 causing the suction valve to open and close, as a result of which a sheet may be subjected to instantaneous suction. This is an example in which if, on the other hand, the sheet is not to be subjected to suction, the suction valve provided at the tip of solenoid 43 is made to assume a closed state, stopping the pressure-reducing action of suction fan 38a on low-pressure chamber 38b, and causing rotating suction roller 1 to assume a state such that it does not subject the sheet to suction. An electrical signal causes solenoid 43 to be switched on, opening the suction valve, and the force of suction from suction fan 38a and low-pressure chamber 38b causes a sheet to be subjected to suction by way of suction roller 1j, which state is shown at (a) in the upper portion of FIG. 23. A roller 1 formed so as to have suction holes at the surface thereof is thus capable of being employed in a cut-sheet conveyor apparatus. Moreover, constitution may be such that, as shown in the example at FIG. 4, air holes 10f are formed at rotating support member 10 at covering 3, causing non-gap-forming portion 7 and gap-forming portion 9 to each be formed at one-half of rotating support member 10, permitting switching on and off of suction to be made possible through detection of position at roller 1, and making it possible to form a low-cost paper feed apparatus. Note that non-gap-forming portion 7 and gap-forming portion 9 are such that, depending on conditions at the apparatus, it is possible to make width 13a at the non-gap-forming portion and width 13b at the gap-forming portion 9 be appropriate widths as necessary.

Furthermore, although not shown in the drawings, by using a cleaning roller comprising the present constitution it will be possible to achieve an apparatus capable of carrying out cleaning of powder and the like as it revolves, and by causing roller 1 to be constituted so as to have air permeability it will be possible to achieve a cleaning apparatus capable of carrying out suction as it revolves.

WORKING EXAMPLES

TABLE 1 shows working examples of woven fabric 2 constituting covering 3 at rotating support member 10. Indicated at Working Example 1 and Working Example 2 in TABLE 1 are coverings 3 in which steps 12 are formed by portions made in satin weave 28 and portions made in plain weave 27 constituting combination of weave patterns and diameters of yarns 5 at weave patterns making up sheet-like non-gap-forming portions 7 and gap-forming portions 9. As indicated at Working Example 1 and Working Example 2, it was possible to adjust air permeability attributable to gap-forming portion 9 depending on whether monofilament 31 was used at small-diameter warp yarn 26a or soft-twist multifilament 30 was used at small-diameter warp yarn 26a. Furthermore, even where weft yarn 25 and large-diameter warp yarn 26b at non-gap-forming portion 7 and gap-forming portion 9 were the same, flattening of yarn made it possible to form steps 12 that were larger when soft-twist multifilament yarn 30 was used at small-diameter warp yarn 26a than when monofilament 31 was used thereat.

filament 31 comprising heat-shrinkable fiber at weft yarn 25 makes it possible to obtain a heat-shrink contraction that is just under 20%. Furthermore, employment of urethane fiber

TABLE 1

|  |  | Working Example 1 | Working Example 2 | Working Example 3 | Working Example 4 | Working Example 5 |
|---|---|---|---|---|---|---|
| Constitution |  | Woven fabric (sheet-like) (satin weave + plain weave) | Woven fabric (sheet-like) (satin weave + plain weave) | Woven fabric (cylindrical weave) (satin weave + plain weave) | Woven fabric (cylindrical weave) (satin weave + plain weave) | Woven fabric (cylindrical weave) (satin weave + plain weave) |
| yarn | Warp yarn 26a (gap-forming portion: portion in plain weave) | Nylon (105 μm) | Nylon 78T/17F (multifilament) | Nylon (83 μm) + urethane (low-contact-point-type) | Polyester (105 μm) (non-heat-shrink yarn) | Polyester (105 μm) + thermally fusible yarn |
|  | Warp yarn 26b (non-gap-forming portion: portion in satin weave) | Nylon 78T/17F | Nylon 78T/17F | Nylon(170 μm) + urethane (low-contact-point-type) (SCY) | Urethane (472D/F) | Urethane (472D/F) |
|  | Weft yarn | Nylon 56T(mono-filament) | Nylon 56T(mono-filament) | Elastic fiber urethane: 472 (D/F) | Heat-shrink yarn (105 μm) (polyester) | Heat-shrink yarn (105 μm) (polyester) |
| Weft density (picks/cm) |  | 24 | 24 | 24 | 38.6 | 27.2 |
| Warp yarn 26a density (ends/cm) |  | 22 | 22 | 22 | 22 | 22 |
| Width of gap-forming portion (mm) (width of portion in plain weave) |  | 2.0 | 2.0 | 1.0 | 1.0 | 1.0 |
| Width of non-gap-forming portion (mm) (width of portion in satin weave) |  | 2.0 | 2.0 | 1.0 | 1.0 | 1.0 |
| Backside coating |  | Yes | Yes | No | No | No |
| Percent elongation or percent heat-shrink contraction |  | — | — | 60% | 19% (percent heat-shrink contraction) | 17% (percent heat-shrink contraction) |
| Thickness $t_1$ at gap-forming portion (mm) (portion using warp yarn 26a) |  | 0.19 | 0.17 | 0.41 | 0.21 | 0.21 |
| Thickness $t_2$ at non-gap-forming portion (mm) (portion using warp yarn 26b) |  | 0.30 | 0.23 | 0.50 | 0.47 | 0.37 |
| Step: $H = t_1 - t_2$ (mm) |  | 0.11 | 0.06 | 0.09 | 0.26 | 0.16 |
| Resistance to airflow of covering R (KPa sec/m) |  | 0.016 | 1.480 | 0.019 | — | — |
| Coefficient of friction (front) |  | 0.25 | 0.25 | 0.96 | 0.51 | 0.53 |
| Coefficient of friction (back) |  | 0.23 | 0.23 | 0.87 | 0.48 | 0.42 |
| Prevention of fraying at ends (after covering installed) |  | ○ | ○ | ○ | ○ | ○ |

Moreover, indicated at Working Example 3 is a covering 3 comprising cylindrical weave 23 employing covered yarn 5 in which monofilament 31 comprising Nylon constituting core yarn 32 is covered with low-melting-point urethane at warp yarn 26, and urethane which is elastic fiber at weft yarn 25, use of low-melting-point urethane fiber constituting elastic fiber as covering at the surface of warp yarn 26 making it possible to cause involvement of elastic fiber at the surface and permitting attainment of a coefficient of friction that is around 1.0. In contradistinction hereto, with woven fabric 2 that had not been imparted with elastic fiber it was possible to achieve a coefficient of friction of 0.25, which is a low value for resin material. In other words, a surface having low coefficient of friction or high coefficient of friction can be easily formed depending on material(s) of yarn 5 and material(s) imparted thereto. Moreover, employment of yarn 5 which is elastic fiber comprising urethane at weft yarn 25 makes it possible to achieve a constitution in which percent elongation is 50% or more.

Indicated at Working Example 4 and Working Example 5 are examples of coverings 3 fabricated in cylindrical weave 23 through employment of heat-shrinkable fiber at weft yarn 25. As indicated at Working Example 4 and Working Example 5, employment of polyester yarn which is monowhich is not the low-melting-point type as the urethane that is employed at large-diameter warp yarn 26b makes it possible to cause coefficient of friction to be made lower than is the case when low-melting-point is used at the surface. Furthermore, with respect to fraying of yarn 5, for sheet-like embodiments, yarn 5 which has undergone coating treatment and/or adhesion and/or thermal fusing is included therein, permitting prevention of fraying even after cutting. Furthermore, for covering 3 comprising cylindrical weave 23, heat-shrinkage causes plastic deformation, permitting prevention of fraying of yarn 5. Furthermore, at Working Example 3 which employs low-melting-point urethane, fusion of low-melting-point urethane fibers prevents fraying of yarn 5. Moreover, at woven fabric 2 which employs multifilament yarn 30a, impregnation by coating agent and/or adhesive occurs easily throughout soft-twist multifilament 30, permitting more thorough binding thereof, and permitting prevention of fraying at end(s). Note that prevention of fraying of end(s) was confirmed by rubbing the end(s) with #120 sandpaper, the results following which are indicated at the item "prevention of fraying at ends (after covering installed)".

Next, covering 3 of test width 20 mm which had elastic fiber which was low-melting-point urethane and which was the woven fabric 2 having stripes and having stretchability at Working Example 3 was used to cover rotating support member 10 comprising aluminum, results of investigation into the relationship between force of tightening (N) and slippage torque load (N/cm) being shown in the graph at FIG. 26. Furthermore, FIG. 27 is a drawing showing the measurement method used. At the measurement method shown in FIG. 27, covering 3 comprising woven fabric 2 held in place by stationary bar 1l is wound about aluminum roller 1k, force F is applied in the direction shown in the drawing, aluminum roller 1k is rotated in the direction of the arrow, and the torque at which slippage occurs between covering 3 and aluminum roller 1k is measured. As shown in the graph at FIG. 26, results of measurements from this test indicated that increase in tensile force which constitutes the force with which covering 3 is tightened against aluminum roller 1k caused torque load for occurrence of slippage between aluminum roller 1k and covering 3 to increase in first-order linear fashion in direct proportion to the force of tightening. Stating this differently, increase in the force of tightening against or the force of contact with rotating support member 10 results in decreased tendency for occurrence of dislocation. Note that in an ordinary roller apparatus that carries out conveyance by formation of a nip between rollers 1, nip pressure is such that load per cm of width is 0.5 N to 1.0 N, and is 2 N at most. The reason for this nip pressure is so as not to produce scratches on the sheet-like conveyed object; this is also the nip pressure which is required to obtain precision feeding. From the present results, as slippage torque load is such that the torque load required to prevent dislocation of covering 3 increases in first-order linear fashion as a function of tensile force, i.e., force of tightening, it is clear that a slippage torque load which is more than adequate can be obtained. Furthermore, looking at the inclination, i.e., slope, of the first-order linear relationship in the graph, this is 0.9 or higher, which is a level that does not present a problem in terms of coefficient of friction.

FIG. 28 is a graph showing the relationship between steps 12 at woven fabric 2 and load at which derailment (dislocation) from grooves 40a at valleys therein occurs, being a graph which shows the effect of steps 12 at woven fabric 2. As shown at FIG. 28, increasing the size of step 12 causes the lateral load, i.e., dislocation load, required for derailment from groove 10b to increase in first-order linear fashion. In other words, it is clear that dislocation of covering 3 can be prevented by means of step 12 and groove 10b. Note that this test was performed using the apparatus shown in the next drawing, i.e., FIG. 29. The woven fabric 2 that was used in this test was woven fabric 2 having stripes 4 in a pattern of bands, sizes of the respective steps 12 being varied by means of large-diameter warp yarn 26b to form steps 12. At the yarn 5 which was used, Nylon yarn 5 without elastic fiber and for which the coefficient of friction of the woven fabric was around 0.25 was employed, length of the stripes 4 in the pattern of bands being 40 mm, pitch 14 being 4 mm, and width of the stripes 4 in the pattern of bands being 2 mm; results of investigation of load are presented at the graph in FIG. 28. This graph confirms that dislocation can be prevented even in situations where coefficient of friction is low. Based on this investigation, it is thought that by causing the constitution to be such that urethane fiber which is elastic fiber appears at the back surface, it will be possible to achieve further increase in coefficient of friction and prevention of dislocation.

FIG. 29 is a drawing showing the test apparatus which was employed in the method for testing the effect of steps 12 at FIG. 28 and which comprises lateral dislocation prevention guide member 39, mounting fixture 40 which is placed thereover, and load 41 which is placed on this mounting fixture 40. In accordance with the test method employing this apparatus, tensile load in direction F serving as derailment load in the direction of the arrow which is perpendicular to the orientation of stripes 4 in a pattern of bands constituting steps 12 comprising concave grooves 40a and convex ridges 40b serving as lateral dislocation prevention guide member 39 is applied to load 41 having prescribed weight per unit area, and the relationship between the size of steps 12 and the lateral dislocation load was investigated.

FIG. 30 shows exemplary operations for manufacture of a roller 1 as a result of causing rotating support member 10 to be covered by covering 3 comprising cylindrical weave 23 formed using heat-shrink weft yarn 25. As shown at (a) in FIG. 30, cylindrical weave 23 is used to fabricate heat-shrinkable cylindrically shaped covering 3 comprising gap-forming portions 9 and non-gap-forming portions 7. This cylindrical weave 23 is formed using yarn 5 comprising polyester fiber that contracts in heat-shrink fashion by just under 20% at 150° C. at weft yarn 25 which is heat-shrink yarn 5. Rotating support member 10 shown at (b) and having outside circumference of length smaller than the length of the inside circumference of this cylindrical covering 3 is then inserted into the interior of cylindrical covering 3 as the diameter of this cylindrical covering 3 is made larger, causing rotating support member 10 to be covered by covering 3 as shown at (c). Rotending support member 10 which is covered by covering 3 is then heated for 5 minutes in an oven at 150° C. to cause contraction in heat-shrink fashion as shown at (d), causing the ends of cylindrical covering 3 to be brought into intimate contact with the ends of rotating support member 10 and with rotating support member 10 in similar fashion as at FIG. 13. Retainer rings 34 which prevent fraying of ends and which prevent rotational dislocation as shown in FIG. 14 are thereafter, at either end of roller 1, installed as shown at (e) on the shaft portion making up rotating shaft 10g of rotating support member 10, to produce the completed roller 1 which is covered with covering 3 as shown at (f).

Results of investigation of dislocation using covering 3 at Working Example 4 with a roller 1 manufactured in this way are shown at TABLE 2.

TABLE 2

|  | Working Example 4-1 | Working Example 4-2 | Working Example 4-3 | Working Example 4-4 | Comparative Example |
|---|---|---|---|---|---|
| Length of inside circumference of covering (mm) | 73.2 | 73.2 | 73.2 | 73.2 | 73.2 |
| Outside diameter of rotating support member (mm) | ø20 | ø21 | ø22 | ø23 | ø21 |

TABLE 2-continued

|  | Working Example 4-1 | Working Example 4-2 | Working Example 4-3 | Working Example 4-4 | Comparative Example |
|---|---|---|---|---|---|
| Recesses and projections on surface of rotating support membe? | No | No | No | No | No |
| Percent contraction (%) | 14.2 | 9.8 | 5.6 | 1.29 | 9.8 |
| Surface of rotating support member treated with primer? | Yes | Yes | No | No | No |
| No dislocation of covering? | OK | OK | OK | OK | NG |

Notes:
(1) "OK" indicates that was okay despite application of 6 N or more of slippage torque load on 30 mm width.
(2) Woven fabric used was that of Working Example 4.

As indicated at TABLE 1, the percent heat-shrink contraction of woven fabric 2 at Working Example 4 by itself was 19%. This Working Example 4 was employed for Working Example 4-1, Working Example 4-2, Working Example 4-3, and Working Example 4-4 at TABLE 2, and a Comparative Example was moreover added, as indicated at TABLE 2. With respect to the situation that existed when used with rotating support member 10, at Working Example 4-1 and Working Example 4-2, for which percent contraction was about 10% or more, application of rubber-type primer (Sunstar Engineering Inc.: US-3) to rotating support member 10 made it possible to achieve antirotation effect at covering 3 and eliminate dislocation of covering 3, a result of "OK" being obtained. Furthermore, at Working Example 4-3 and Working Example 4-4, for which primer was not used, achievement of antirotation effect was indicated with a percent contraction due to heating of 5.6%0 or less, and as there was no dislocation of covering 3, the fact that a result of "OK" could be obtained was confirmed.

Moreover, as Comparative Example, the situation that existed when used with rotating support member 10 was such that the cylindrical woven fabric 2, for which contraction of the cylindrical woven fabric 2 was around 10%, was used without application of rubber-type primer, as a result of which the force of tightening was weak and there was dislocation of covering 3, which spun around loosely thereon, for a result that was "NG". As described above, where contraction is such that a percent contraction of about 5% or more is required, it is preferred that primer be applied to the surface of rotating support member 10, and it is more preferred that the primer employed be rubber-type primer. As rubber-type primer, there are UM-2, US-3, and the like manufactured by Sunstar Engineering Inc., use of which is preferred. Moreover, even where percent contraction is 5% or less, employment of primer is not a problem, as this will permit achievement of even stronger antislip effect. Note that such primer may also be employed and prevention of slippage carried out in situations where a stretchable covering 3 is employed.

TABLE 3 and TABLE 4 show results of investigation of air suction force and suction distance when covering 3 for rotating support member 10 of the present working examples was used. First, as indicated at the central column in TABLE 3, using covering 3 from Working Example 4 at TABLE 1 and a DC fan motor having a fan diameter of 40 mm producing weak airflow, i.e., 0.39 m³/min, a gap 15 of 5 mm was formed between fan and sheet (paper), and it was found as a result of investigation into suction force that suction of a sheet which weighed 3.0 g was possible with 0.39 m³/min of airflow. For comparison, suction of a sheet weighing 4.5 g was possible when no covering 3 was employed as indicated in the column at left Furthermore, at the column at right, covering 3 from Working Example 2 at TABLE 1, which was a woven fabric made to have high airflow resistance in which warp yarn 26a at gap-forming portion 9 was multifilament 30 comprising soft-twist yarn, and a DC fan motor having a fan diameter of 92 mm producing strong airflow, i.e., 1.14 m³/min, were employed, and it was found as a result of investigation into suction that conditions were such that suction of a sheet which weighed 0.02 g was not possible.

TABLE 3

| | Fan | | |
|---|---|---|---|
| | Air Flow: 0.39 m³/min | | Air Flow: 1.14 m³/min |
| | Covering 3 present? | | |
| | No (for comparative purposes) | Yes (covering from Working Example 4) | Yes (covering from Working Example 2) |
| Gap between fan and sheet (paper) | 5 mm | 5 mm | 5 mm |
| 1) Constitution of warp yarn 26a at gap-forming portion 9 | — | Monofilament | Multifilament (soft-twist) |
| 2) Constitution of weft yarn 25 at gap-forming portion 9 | — | Monofilament | Monofilament |

TABLE 3-continued

|  | Fan | | |
|---|---|---|---|
|  | Air Flow: 0.39 m³/min | | Air Flow: 1.14 m³/min |
|  | | Covering 3 present? | |
|  | No (for comparative purposes) | Yes (covering from Working Example 4) | Yes (covering from Working Example 2) |
| Sheet suction status and weight thereof | Suction possible 4.5 g | Suction possible 3.0 g | Suction not possible 0.02 g |

Moreover, as shown at TABLE 4, as a result of investigation into the width of the gap at which suction was possible with a 4 g/cm² sheet using a DC fan motor having a fan diameter of 92 mm producing 1.14 m³/min of airflow it was found as indicated at the central column that the gap at which suction was possible was around about 8.0 mm when using covering 3 from Working Example 4 at TABLE 1; and as indicated at the column at right it was found, as had been the case at TABLE 3, that suction was not possible when using covering 3 from Working Example 2 at TABLE 1, width of the gap 15 being 0 mm. On the other hand, for the Comparative Example in which there was no covering 3 which is shown in the column at left, width of the gap 15 at which suction was possible was 10.5 mm.

TABLE 4

|  | When fan producing 1.14 m³/min of airflow was used | | |
|---|---|---|---|
|  | | Covering present? | |
|  | No (Comparative Example) | Yes (convering from Working Example 4) | Yes (convering from Working Example 2) |
| Constitution of gap-forming portion | 5 mm | 5 mm | 5 mm |
| 1) Constitution of warp yarn 26a | — | Monofilament | Multifilament 30 (soft-twist) |
| 2) Constitution of weft yarn 25 | — | Monofilament | Monofilament |
| Width of gap at which suction 4 g/50 cm² sheet was possible | 10.5 mm | 8.0 mm | 0 mm (suction not possible) |

As described above, forming stripes 4 in a pattern of bands having gap-forming portion(s) 9 and non-gap-forming portion(s) 7 at woven fabric 2 makes it possible by means of such gap-forming portion(s) 9 to attain a woven fabric 2 in which it is possible to form gaps 15 required for suction or blowing. Moreover, if the direction of the stripes 4 in the pattern of bands at the woven fabric 2 is made to be the axial direction 20, if yarn 5 which is elastic fiber having high coefficient of friction comprising urethane fiber or the like is employed at yarn 5 in non-gap-forming portion(s) 7, and if projections are formed at the surface, it will be possible to cause contact with the conveyed object as seen in sectional view to be constituted such that there is two-point contact, making it possible to achieve even further improvement in conveying force. As a result of this improvement in conveying force, by causing dust, paper dust, and the like to enter the recesses and projections present at covering 3, it will be possible to cause dust paper dust, and/or the like which adheres to the surface to be rendered harmless, and so roller 1 in accordance with the present invention makes it possible for conveyance characteristics to be made stable. Furthermore, if yarn 5 which is soft-twist multifilament 30 is used at warp yarn 26 and projections produced by satin weave 28 are provided at the back surface, the front surface will assume an approximately flat state, making it possible to decrease the tendency for scratches to be produced on sheets and other such thin conveyed objects. Moreover, the projections can be made to engage with grooves 10b provided at the surface of rotating support member 10, making it possible to carry out prevention of dislocation of covering 3 in the direction of rotation 19.

It facilitates fabrication in the form of roller(s) 1 at apparatus(es) carrying out cooling, drying, and/or suction, these being effects of gaps (lattice-like holes) 15 at gap-forming portion 9 in woven fabric 2; and in addition, by causing the constitution to be such that it comprises a portion of width 13a at non-gap-forming portion 7 and a portion of width 13b at gap-forming portion 9 as shown in the example at FIG. 4, it will be possible to cause a portion in a state such that it is without air permeability at roller 1 to be formed from the portion of width 13a at non-gap-forming portion 7, permitting provision of a roller 1 that had not been possible conventionally.

Moreover, at conventional rollers 1 which have recesses and projections and at which surface layer(s) comprise rubber layer(s), whereas recesses and projections for reducing dust, paper dust, and the like which contaminate the surface of roller 1 have been provided in attempts to stabilize conveyance characteristics, because recesses and projections are formed from rubber layer(s) they require rubber thickness 22; and in addition, because they are elastic bodies 33, it has been extremely difficult to demand precision at the outside diameter thereof, so these have often been used as feed rollers 1b, belt idler rollers 1f, and in other such situations where high precision at the outside diameter is not demanded. However, at roller 1 in accordance with the present invention, covering 3 is a thin covering 3 comprising woven fabric 2, and where monofilament 31 is employed as base at core yarn 32, thickness 22 being determined by filament diameter at monofilament 31 and diameter of yarn(s) entangled with core yarn 32, there will be high precision at thickness 22, the constitution being such that precision will depend on the precision of rotating support member 10, precision depending on the precision of metal when rotating support member 10 is metal, and depending on the precision with which resin is molded when rotating support member 10 comprises molded resin, and so these will permit achievement of stable precision. Moreover, with respect to gripping characteristics, which are a property of rubber, employment of elastic fiber comprising urethane fiber or the like at yarn 5 will make it possible to obtain a roller 1 capable of producing gripping characteristics equivalent to or better than those of rubber.

Roller 1 in accordance with the present application is thus a roller 1 in which the surface of rotating support member 10 is provided with a covering 3 comprising woven fabric 2 that did not exist conventionally, being a low-cost roller 1 which permits conservation of resources, conservation of energy, and recycling. Moreover, this roller 1 may be employed to form a low-cost apparatus which did not exist conventionally and which permits conservation of resources, conservation of energy, and recycling.

EXPLANATION OF REFERENCE NUMERALS

1 Roller
1*a* Drive roller
1*b* Feed roller (pickup roller)
1*c* Conveyor roller
1*d* Lead edge alignment roller
1*e* Belt drive roller
1*f* Belt idler roller
1*g* Fuser roller
1*h* Cooling roller
1*i* Roller conveyor
1*j* Suction roller
1*k* Aluminum roller
1*l* Stationary bar
2 Woven fabric
2*a* Cylindrical woven fabric
2*b* Open end
3 Covering
4 Stripes in a pattern of bands
5 Yarn
6 Rectangular pattern
7 Non-gap-forming portion
7*a* Gapless region
8 Lattice-like gaps
9 Gap-forming portion
9*a* Gap region
10 Rotating support member
10*a* End
10*b* Groove
10*c* Protrusion
10*d* Hook
10*e* Flange
10*f* Air hole
10*g* Rotating shaft
10*h* Hole
11 Angle
12 Step
12*a* Step due to thickness(es) of yarn
13 Width
13*a* Width of non-gap-forming portion
13*b* Width of gap-forming portion
14 Yarn pitch
14*a* Weft yarn pitch
14*b* Pitch between small-diameter warp yarns 26*a*
14*b* Pitch between large-diameter warp yarns 26*b*
15 Gap
16 Pattern of lateral bands
17 Long direction
18 Suction hole or injection hole
19 Direction of rotation
20 Axial direction
21 Pattern of longitudinal bands
22 Thickness
$H_1$ Dimension at gap-forming portion
$H_2$ Dimension at non-gap-forming portion
23 Striped weave
23*a* Cylindrical weave
23*b* Sheet-like weave
24 Lattice-like pattern
25 Weft yarn
26 Warp yarn
26*a* Small-diameter warp yarn
26*b* Large-diameter warp yarn
27 Plain weave
27*a* Mesh portion
28 Satin weave
29 Twill weave
30 Multifilament
30*a* Multifilament yarn
31 Monofilament
31*a* Monofilament yarn
31*b* Filament yarn
32 Core yarn
33 Elastic body
34 Retainer ring
35 Conveyor belt
36 Intermediate transfer belt
37 Paper
38 Suction apparatus
38*a* Suction fan
38*b* Low-pressure chamber
39 Lateral dislocation prevention guide member
40 Mounting fixture
40*a* Concave groove
40*b* Convex ridge
41 Load
42 Twist angle
43 Solenoid
$D_1$ Outside diameter (of rotating support member)
$D_2$ Inside diameter (of cylindrical woven fabric)

The invention claimed is:

1. A roller, comprising:
    a rotating support member having a surface with wholly or partially a cylindrical shape; and
    a covering comprising woven fabric, the covering being fixed on the surface of the rotating support member,
    wherein the woven fabric is woven with a stripe pattern including two or more different patterns of bands, the woven fabric having more air-permeable portions in which warp yarn and weft yarn are woven less tightly and less air-permeable portions in which yarns of the woven fabric are woven tighter than the air-permeable portions,
    wherein the more air-permeable portions and the less air-permeable potions have different thicknesses from one another, and
    wherein the stripe pattern is extending parallel to an axial direction of the roller.

2. The roller according to claim 1, wherein the woven fabric is in a sheet shape.

3. The roller according to claim 1, wherein the woven fabric constituting the covering provided on the surface of the roller is in a cylindrical shape woven fabric.

4. The roller according to claim 3, wherein the covering in a cylindrical shape woven fabric is formed of the seamless cylindrical woven fabric in striped weave comprising heat-shrinkable cylindrical woven fabric in a direction of inner peripheral length of the covering being employed heat-shrink yarn at weft yarn.

5. The roller according to claim 4,
wherein heat applied from the surface cause the heat-shrinkable cylindrical woven fabric to shrink and cause the woven fabric to come into contact intimately with the surface of roller, and wherein the heat applied also cause plastic deformation and heat-shrinkage of the diameter of the cylindrical woven fabric at portions of cylindrical woven fabric extending beyond ends of the surface of the roller.

6. The roller according to claim 1, wherein difference in thicknesses is formed between the more air-permeable portions and the less air-permeable potions by at least one of:
   difference in yarn diameter of the warp yarn used between the more air-permeable portions and the less air-permeable portions, and
   difference in flattening of multifilament at soft-twist multifilament yarn comprising a plurality of fibers at the warp yarn.

7. The roller according to claim 6, wherein the woven fabric comprises at least one fraying prevention means selected from the group consisting of:
   thermoplastic deformation or plastic deformation due to stress on the yarn,
   adhesive or coating agent, or
   welding through inclusion of low-melting-point hot-melt yarn within the yarn of the woven fabric.

8. The roller according to claim 1, wherein the opening ratio at the more air-permeable portion is such that the sizes of the lattice-like holes are formed in the more air-permeable portion by controlling at least one of:
   yarn densities of the warp yarn and the weft yarn in the more air-permeable portion,
   flattening of the yarn at the soft-twist multifilament yarn at the more air-permeable portion, and
   yarn diameter of the warp yarn and the yarn diameter of the weft yarn.

9. The roller according to claim 1, wherein the woven fabric comprises a yarn of lower coefficient of friction and a yarn of high coefficient of friction.

10. The roller according to claim 1, wherein the roller comprises means for preventing dislocation of the covering from the rotating member comprises at least one selected from the group consisting of:
   a grip stretching the woven fabric to cause friction between the covering and the rotating support member,
   protrusions constituting roughness of the surface of the rotating support member,
   a projection at the covering and a recess at the rotating support member,
   mesh-like gaps in the woven fabric and protrusion-like regions or hook-like regions on the rotating support member that engage with the mesh-like gaps,
   adhesion or thermal fusing, and
   an anti-rotation member.

11. The roller according to claim 1, wherein the more air-permeable portions and a non-gap-forming portion are formed in alternating fashion in an axial direction.

12. The roller according to claim 1, wherein the more air-permeable portions and the less air-permeable portions are formed in alternating fashion in a rotational direction.

13. The roller according to claim 1, wherein the interior of rotating support member is hollow, and has through holes at the surface.

14. The roller according to claim 13, wherein air is sucked or injected from an end of the roller.

15. The roller according to claim 13, wherein air is sucked or injected through a rotating shaft.

16. The roller according to claim 13, wherein air is sucked, and the roller is connected to a suction device comprising a low-pressure chamber, suction fan, and a solenoid to control opening and closing of a suction valve by electrical signal, wherein suction fan causes reduction in the pressure of low-pressure chamber.

\* \* \* \* \*